US012794866B2

(12) United States Patent
Chen et al.

(10) Patent No.: US 12,794,866 B2
(45) Date of Patent: Nov. 10, 2026

(54) ENCRYPTED COMMUNICATION METHOD AND APPARATUS, DEVICE, AND STORAGE MEDIUM

(71) Applicant: Beijing VNET Broadband Data Center Co., Ltd., Beijing (CN)

(72) Inventors: Sheng Chen, Beijing (CN); Xinman Li, Beijing (CN); Kun Cai, Beijing (CN); Lei Tong, Beijing (CN); Ju Ma, Beijing (CN)

(73) Assignee: Beijing VNET Broadband Data Center Co., Ltd., Beijing (CN)

( * ) Notice: Subject to any disclaimer, the term of this patent is extended or adjusted under 35 U.S.C. 154(b) by 305 days.

(21) Appl. No.: 18/690,469

(22) PCT Filed: Nov. 8, 2022

(86) PCT No.: PCT/CN2022/130453
§ 371 (c)(1),
(2) Date: Sep. 26, 2024

(87) PCT Pub. No.: WO2023/036348
PCT Pub. Date: Mar. 16, 2023

(65) Prior Publication Data

US 2025/0133068 A1 Apr. 24, 2025

(30) Foreign Application Priority Data

Sep. 8, 2021 (CN) ......................... 202111049948.2
Sep. 8, 2021 (CN) ......................... 202111050009.X
(Continued)

(51) Int. Cl.
*H04L 29/06* (2006.01)
*H04L 9/40* (2022.01)

(52) U.S. Cl.
CPC ...... *H04L 63/0442* (2013.01); *H04L 63/0876* (2013.01)

(58) Field of Classification Search
None
See application file for complete search history.

(56) References Cited

U.S. PATENT DOCUMENTS 10,511,591 B2 * 12/2019 Campagna ............ H04L 63/061
2003/0120800 A1 6/2003 Novetzke et al.
(Continued)

FOREIGN PATENT DOCUMENTS

CN 101304407 A 11/2008
CN 101404579 A 4/2009
(Continued)

OTHER PUBLICATIONS

Office Action received for Chinese Patent Application No. 202111049948.2, mailed on Jul. 14, 2023, 9 pages (4 pages of English Translation and 5 pages of Original Document).
(Continued)

*Primary Examiner* — Benjamin E Lanier
(74) *Attorney, Agent, or Firm* — ArentFox Schiff LLP; Michael Fainberg

(57) ABSTRACT

An encrypted communication method and apparatus, a device, and a medium are disclosed. The method includes: a first protocol layer of a first party obtains a MAC address of a second party according to a data transmission request from an application layer, the data transmission request including an NLP address of the second party; the first protocol layer generates a first temporary key pair including a first temporary public key and a first temporary private key; the first protocol layer obtains a second temporary public key of the second party according to the first temporary public key; the first protocol layer generates a shared
(Continued)

| Hardware type (2 bytes) | Protocol (2 bytes) | Hardware address size (2 bytes) | Address size (2 bytes) | Request type (2 bytes) |
|---|---|---|---|---|
| Source MAC address (6 bytes) | | | | |
| NLP source address (32 bytes) | | | | |
| Destination MAC address (6 bytes) | | | | |
| NLP destination address (32 bytes) | | | | |
| Time stamp+Signature (4+64 bytes) | | | | |

key according to the second temporary public key and the first temporary private key; the first protocol layer determines a data message, the data message carrying encrypted data obtained by encrypting using the shared key, and the receiver of the data message being the second party.

18 Claims, 13 Drawing Sheets

(30) Foreign Application Priority Data

Sep. 8, 2021 (CN) ......................... 202111051275.4
Sep. 8, 2021 (CN) ......................... 202111051342.2

(56) References Cited

U.S. PATENT DOCUMENTS

| | | | |
|---|---|---|---|
| 2004/0025018 A1 | 2/2004 | Haas et al. | |
| 2011/0023087 A1* | 1/2011 | Aoki | H04L 65/1073 709/224 |
| 2011/0055571 A1 | 3/2011 | Gluck | |
| 2011/0119534 A1 | 5/2011 | Liu et al. | |
| 2015/0204964 A1* | 7/2015 | Hirano | G01S 5/12 370/252 |
| 2018/0013788 A1 | 1/2018 | Mssamsetty et al. | |
| 2019/0306705 A1 | 10/2019 | Suzuki | |
| 2020/0218821 A1* | 7/2020 | Liu | H04L 63/0442 |

FOREIGN PATENT DOCUMENTS

| | | |
|---|---|---|
| CN | 101640631 A | 2/2010 |
| CN | 101938500 A | 1/2011 |
| CN | 109787758 A | 5/2019 |
| CN | 111835752 A | 10/2020 |
| CN | 112235608 A | 1/2021 |
| CN | 112565207 A | 3/2021 |
| CN | 113904766 A | 1/2022 |
| CN | 113904807 A | 1/2022 |
| CN | 113905012 A | 1/2022 |

OTHER PUBLICATIONS

Office Action received for Chinese Patent Application No. 202111050009.X, mailed on Jun. 30, 2023, 14 pages (6 pages of English Translation and 8 pages of Original Document).

Office Action received for Chinese Patent Application No. 202111051342.2, mailed on Feb. 1, 2024, 9 pages (4 pages of English Translation and 5 pages of Original Document).

Search Report and Written Opinion received for Singaporean Patent Application No. 11202403935T, mailed on Jan. 15, 2026, 12 pages.

* cited by examiner

| | | | | |
|---|---|---|---|---|
| 14 bytes | 72 bytes | Optional | Variable length | Variable length |
| Ethernet Header | NLP basic header | NLP extension header | Transport layer header | Data |

FIG. 1

| | | | | | |
|---|---|---|---|---|---|
| 2 bytes | 2 bytes | 2 bytes | 2 bytes | 1 byte | 1 byte |
| Version | Service | Flow label | Packet length | Next header | Hop count |
| NLP source address (32 bytes) | | | | | |
| NLP destination address (32 bytes) | | | | | |

FIG. 2

| Next header (1 byte) | Type (1 byte) | Reserved (2 bytes) |
|---|---|---|
| Time stamp (4 bytes) | | |
| Temporary public key (32 bytes) | | |
| Digital signature (64 bytes) | | |

FIG. 3

| Next header (1 byte) | Type (1 byte) | Encrypted data length (2 bytes) |
|---|---|---|
| Serial number (Time stamp 4 bytes) | | |

FIG. 4

| Hardware type (2 bytes) | Protocol (2 bytes) | Hardware address size (2 bytes) | Address size (2 bytes) | Request type (2 bytes) |
|---|---|---|---|---|
| Source MAC address (6 bytes) | | | | |
| NLP source address (32 bytes) | | | | |
| Destination MAC address (6 bytes) | | | | |
| NLP destination address (32 bytes) | | | | |
| Time stamp+Signature (4+64 bytes) | | | | |

FIG. 5

| 14 bytes | 72 bytes | 104 bytes |
|---|---|---|
| Ethernet Header | NLP basic header | NLPKey extension header |

FIG. 6

| 14 bytes | 72 bytes | 8 bytes | Variable length |
|---|---|---|---|
| Ethernet Header | NLP basic header | NLPSec extension header | Encrypted data |

FIG. 7

ENCRYPTED COMMUNICATION METHOD AND APPARATUS, DEVICE, AND STORAGE MEDIUM

CROSS-REFERENCE TO RELATED APPLICATIONS

This application is a National Stage of International Application No. PCT/CN2022/130453, filed on Nov. 8, 2022, which claims priorities to Chinese Patent Application No. 202111050009.X, filed with the China National Intellectual Property Administration on Sep. 8, 2021 and entitled "Encrypted Communication Method and Apparatus, Device, and Medium", Chinese Patent Application No. 202111051342.2, filed with the China National Intellectual Property Administration on Sep. 8, 2021 and entitled "Communication Method and Apparatus, Device, and Medium", Chinese Patent Application No. 202111049948.2, filed with the China National Intellectual Property Administration on Sep. 8, 2021 and entitled "Source Address Authentication Method and Apparatus, Electronic Device, and Storage Medium", and Chinese Patent Application No. 202111051275.4, filed with the China National Intellectual Property Administration on Sep. 8, 2021 and entitled "Communication Method and Apparatus, Electronic Device, and Storage Medium", all of which are hereby incorporated by reference in their entireties.

TECHNICAL FIELD

The present application relates to the technical field of network communication, and in particular to an encrypted communication method, apparatus, device and medium.

BACKGROUND

In the Internet, the network transport layer protocol generally uses the Transmission Control Protocol (Transmission Control Protocol/Internet Protocol, TCP/IP), and all data of the transport layer such as TCP, User Datagram Protocol (UDP) and other transport layer protocols are directly encapsulated into IP data packets for transmission.

When data is transmitted in a network layer using the TCP/IP protocol, an attacker can spoof the target host through the IP address, to carry out denial of service attack, forged TCP connection, session hijacking, hidden attack host address and the like on the target host. For an application scenario in which a receiving party only needs to receive data or information (one-sided communication), when an attacker masquerades as a sending party to send an attack data packet to the receiving party through IP spoofing, because the receiving party cannot verify the source identity of the received data packet, the receiving party is vulnerable to attack.

When data is transmitted in a network using the TCP/IP protocol, for a scenario in which both sides of communication need to interact, attacks on either side may cause the two sides to be unable to communicate normally.

In view of this, how to achieve data security in the process of communication has become an urgent technical problem to be solved.

SUMMARY

The present application provides an encrypted communication method, apparatus, device and storage medium, to solve problems of communication processes being easily attacked and data transmission risks in related art.

In a first aspect, the present application provides an encrypted communication method, applied to a first party, where the first party uses a new link protocol (NLP) stack, and the method includes:

obtaining, by a first protocol layer of the first party, an MAC address of a second party according to a data transmission request from an application layer, where the data transmission request includes an NLP address of the second party; generating, by the first protocol layer, a first temporary key pair, where the first temporary key pair includes a first temporary public key and a first temporary private key; obtaining, by the first protocol layer, a second temporary public key of the second party according to the first temporary public key; generating, by the first protocol layer, a shared key according to the second temporary public key and the first temporary private key; and determining, by the first protocol layer, a data message, where the data message carries the MAC address of the second party and encrypted data obtained by encrypting using the shared key, and a receiving party of the data message is the second party.

Based on this method, data can be encrypted with a shared key to improve communication security.

In a possible implementation, the obtaining, by the first protocol layer of the first party, the MAC address of the second party according to the data transmission request from the application layer, the data transmission request including the NLP address of the second party, includes: determining, by the first protocol layer, the MAC address of the second party according to the NLP address of the second party and a first corresponding relationship, the first corresponding relationship including a corresponding relationship between the NLP address of the second party and the MAC address of the second party.

In a possible implementation, the obtaining, by the first protocol layer of the first party, the MAC address of the second party according to the data transmission request from the application layer, the data transmission request including the NLP address of the second party, includes: generating, by the first protocol layer, an address resolution request message, where a source address of the address resolution request message is an NLP address of the first party, a destination address of the address resolution request message is the NLP address of the second party, the address resolution request message includes the MAC address of the first party and a first signature, the first signature is generated based on a first private key of the first party, and the NLP address of the first party is a public key corresponding to the first private key; obtaining, by the first protocol layer, a first response message from the second party, where the first response message is a response message corresponding to the address resolution request message, a source address of the first response message is the NLP address of the second party, a destination address of the response message is the NLP address of the first party, the response message includes the MAC address of the second party and a second signature, the second signature is generated based on a second private key of the second party, and the NLP address of the second party is a public key corresponding to the second private key; obtaining, by the first protocol layer, the MAC address of the second party, after the first protocol layer determines that the second signature has been verified according to the NLP address of the second party. By adopting this implementation, the first party can obtain the MAC address of the second party, so that attackers cannot compromise communication security by forging the MAC address of the second party, reducing communication risks.

In a possible implementation, the obtaining, by the first protocol layer, the second temporary public key of the second party according to the first temporary public key, includes: generating, by the first protocol layer, a key negotiation request message, where the key negotiation request message includes a third signature and the first temporary public key, a source address of the key negotiation request message is an NLP address of the first party, a destination address of the key negotiation request message is the NLP address of the second party, the third signature is generated based on a first private key of the first party, and the NLP address of the first party is a public key corresponding to the first private key; obtaining, by the first protocol layer, a second response message, where the second response message is a response message corresponding to the key negotiation request message, the second response message includes a fourth signature and the second temporary public key, a source address of the second response message is the NLP address of the second party, a destination address of the second response message is the NLP address of the first party, the fourth signature is generated based on a second private key of the second party, and the NLP address of the second party is a public key corresponding to the second private key; determining, by the first protocol layer, the shared key according to the first temporary private key and the second temporary public key, after the first protocol layer determines that the fourth signature has been verified according to the NLP address of the second party. By adopting this implementation, the key negotiation message is used to negotiate the shared key used by both parties in the communication process, which can prevent the shared key from being illegal stolen and improve the communication security of both parties.

In a second aspect, the present application provides an encrypted communication method, applied to a second party, where the second party uses a new link protocol (NLP) stack, and the method includes: obtaining, by a second protocol layer of the second party, a first temporary public key of a first party; generating, by the second protocol layer, a second temporary key pair, where the second temporary key pair includes a second temporary public key and a second temporary private key; generating, by the second protocol layer, a shared key according to the first temporary public key and the second temporary private key; generating, by the second protocol layer, a message carrying the second temporary public key, where a receiving party of the message is the first party, and the second temporary public key is used for the first party to generate the shared key; and decrypting, by the first protocol layer, encrypted data carried in a data message according to the shared key, where a sending party of the data message is the first party, and the data message further carries an MAC address of the second party.

In a possible implementation, the obtaining, by the second protocol layer of the second party, the first temporary public key of the first party, includes: obtaining, by the second protocol layer of the second party, a key negotiation request message from the first party, where the key negotiation request message includes a third signature and the first temporary public key, a source address of the key negotiation request message is an NLP address of the first party, a destination address of the key negotiation request message is an NLP address of the second party, the third signature is generated based on a first private key of the first party, and the NLP address of the first party is a public key corresponding to the first private key.

In a possible implementation, the generating, the second protocol layer, the second temporary key pair, includes: generating, the second protocol layer, the second temporary key pair, after the second protocol layer determines that the third signature has been verified according to the NLP address of the first party.

In a possible implementation, the generating, by the second protocol layer, the message carrying the second temporary public key, includes: generating, by the second protocol layer, a second response message, where the second response message is a response message corresponding to the key negotiation request message, the second response message includes a fourth signature and the second temporary public key, a source address of the second response message is the NLP address of the second party, a destination address of the second response message is the NLP address of the first party, the fourth signature is generated based on a second private key of the second party, and the NLP address of the second party is a public key corresponding to the second private key.

In a possible implementation, the method further includes: receiving, by the second protocol layer, an address resolution request message from the first party, where a source address of the address resolution request message is an NLP address of the first party, a destination address of the address resolution request message is an NLP address of the second party, the address resolution request message includes an MAC address of the first party and a first signature, the first signature is generated based on a first private key of the first party, and the NLP address of the first party is a public key corresponding to the first private key; generating, by the second protocol layer, a first response message, where the first response message is a response message corresponding to the address resolution request message, a source address of the first response message is the NLP address of the second party, a destination address of the response message is the NLP address of the first party, the response message includes the MAC address of the second party and a second signature, the second signature is generated based on a second private key of the second party, and the NLP address of the second party is a public key corresponding to the second private key.

In a third aspect, the present application provides a communication method, applied to a first party, where the first party uses a new link protocol (NLP) stack, and the method includes: sending, by the first party, an address resolution request message, to a second party, where a source address of the address resolution request message is an NLP address of the first party, a destination address of the address resolution request message is an NLP address of the second party, the address resolution request message includes an MAC address of the first party and a first signature, the first signature is generated based on a first private key of the first party, and the NLP address of the first party is a public key corresponding to the first private key; receiving, by the first party, a first response message from the second party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key; storing, by the first party, a corresponding relationship between the NLP address of the second party and the MAC address of the second party, after determining that the second signature has been verified according to the NLP address of the second party.

Based on this method, the MAC addresses of both communication parties are resolved according to NLP addresses/public keys, which can cope with ARP spoofing and related middle attacks and denial of service attacks, ensuring network communication security.

In a possible implementation, the method further includes: generating, by the first party, the first private key randomly; generating, by the first party, the public key corresponding to the first private key through elliptic curve cryptography according to the first private key; using, by the first party, the public key corresponding to the first private key as the NLP address of the first party.

By adopting this implementation, an NLP address can be determined for each communication device, improving device recognition.

In a possible implementation, the address resolution request message is a VNET Address Resolution Protocol (VARP) message, and the method further includes: encrypting, by the first party, to-be-signed content in the address resolution request message according to the first private key, to obtain the first signature.

By adopting this implementation, a label can be determined for communication, allowing the receiving device to verify communication security based on the label and improve communication reliability.

In a possible implementation, the to-be-signed content includes a time stamp, and the time stamp is used for verifying timeliness of the address resolution request message.

By adopting this implementation, the demand for data timeliness in different scenarios can be met.

In a possible implementation, before the first party sends the address resolution request message to the second party, the method further includes: determining, by the first party, that the MAC address of the second party is not stored in a neighbor list, where the neighbor list is used for storing a corresponding relationship between an NLP address and an MAC address of a communication device communicating with the first party.

By adopting this implementation, an existing neighbor list can be queried and unnecessary communication links can be skipped appropriately to avoid wasting system resources.

In a fourth aspect, the present application provides a communication method, applied to a second party, where the second party uses a new link protocol (NLP) stack, and the method includes: receiving, by the second party, an address resolution request message from a first party, where a source address of the address resolution request message is an NLP address of the first party, a destination address of the address resolution request message is an NLP address of the second party, the address resolution request message includes an MAC address of the first party and a first signature, the first signature is generated based on a first private key of the first party, and the NLP address of the first party is a public key corresponding to the first private key; sending, by the second party, a first response message, after determining that the first signature has been verified according to the NLP address of the first party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key.

In a possible implementation, the method further includes: generating, by the second party, the second private key randomly; generating, by the second party, the public key corresponding to the second private key through elliptic curve cryptography according to the second private key; using, by the second party, the public key corresponding to the second private key as the NLP address of the second party.

In a possible implementation, the first response message is a VNET Address Resolution Protocol (VARP) message, and the method further includes: encrypting, by the second party, to-be-signed content in the first response message according to the second private key, to obtain the first signature. In a possible implementation, the to-be-signed content includes a time stamp, and the time stamp is used for verifying timeliness of the first response message.

In a fifth aspect, the present application provides a method for source address authentication, applied to a sending party, where the sending party uses a new link protocol (NLP) stack, and the method includes:

encapsulating a signature of the sending party, an NLP source address, to-be-sent data, a serial number for preventing replay attack and an NLP destination address into an NLP data packet; where the signature of the sending party is generated using a sending party private key of the sending party, the NLP destination address is a receiving party public key of a receiving party, the NLP source address is a sending party public key of the sending party, and the receiving party uses a new link protocol (NLP) stack; sending the NLP data packet to the receiving party, for the receiving party to verify the signature of the sending party using the signature of the sending party, and record the serial number based on that the verification is passed, and obtain the to-be-sent data.

Based on this method, by carrying an NLP source address and a signature of a sending party that can verify an identity of the sending party and a serial number for preventing replay attack in an NLP data packet of the sending party, a receiving party can directly verify the NLP source address based on the received NLP data packet. The method for source address authentication has characteristics of decentralized self-authentication and other-authentication, non-repudiation of the sending party, and preventing DDOS attacks. In addition, whether the NLP data packet is a data packet for replay attack is verified. When any verification fails, the NLP data packet is discarded, which can effectively resist replay attacks of directly copied packets while preventing IP address spoofing, improving the security of the receiving party. When being applied in unilateral communication with high timeliness requirements, the receiving party can have high timeliness and high network security simultaneously.

In a possible implementation, before encapsulating the signature of the sending party, the NLP source address, the to-be-sent data, the serial number for preventing replay attack and the NLP destination address into the NLP data packet, the method further includes: generating the sending party private key randomly, and generating the sending party public key based on an asymmetric encryption algorithm and the sending party private key.

In a possible implementation, the encapsulating the signature of the sending party, the NLP source address, the to-be-sent data, the serial number for preventing replay attack and the NLP destination address into the NLP data packet, includes: obtaining the NLP destination address and the to-be-sent data from the data transmission request; resolving the NLP destination address obtain a receiving party physical address of a receiving party; encrypting partial header information at least including a serial number and a random number in the NLP data packet by using the sending party private key, to obtain the signature of the sending party; encapsulating the signature of the sending party, the NLP source address, a sending party physical address of the sending party, the NLP destination address, the receiving party physical address, and the to-be-sent data into the NLP data packet.

In a possible implementation, a plurality of serial numbers in a plurality of data packets sent continuously from the sending party to the receiving party are set in an ascending order.

In a possible implementation, the serial number includes a time stamp.

In a sixth aspect, the present application provides a method for source address authentication, applied to a receiving party, where the receiving party uses a new link protocol (NLP) stack, and the method includes: receiving an NLP data packet sent from a sending party; where the NLP data packet is obtained by encapsulating a signature of the sending party, an NLP source address, to-be-sent data, a serial number for preventing replay attack and an NLP destination address, the signature of the sending party is generated using a sending party private key of the sending party, the NLP destination address is a receiving party public key of the receiving party, the NLP source address is a sending party public key of the sending party, and the sending party uses the NLP stack; obtaining the NLP source address, the signature of the sending party and the serial number from the NLP data packet; verifying authenticity and non-repeatability of a source of the NLP data packet based on the NLP source address, the signature of the sending party and the serial number, storing the serial number and obtaining the to-be-sent data based on that the verification passes, and discarding the NLP data packet based on that the verification fails.

In a possible implementation, the verifying the authenticity and non-repeatability of the source of the NLP data packet based on the NLP source address, the signature of the sending party and the serial number, includes: verifying the signature of the sending party by using the NLP source address, and determining that the source of the NLP data packet is the sending party based on that the verification is successful; determining whether the serial number for preventing replay attack is greater than a serial number in an NLP data packet previously received from the sending party, and determining that the NLP data packet is not repetitive based on that the serial number is greater than the serial number in the NLP data packet previously received.

In a seventh aspect, the present application provides a communication method, applied to a first party, where the first party uses a new link protocol (NLP) stack, and the method includes: generating a key negotiation message including a first signature, a first NLP address, and a first temporary public key according to a data transmission request; where the key negotiation message is used for identity authentication and key exchange between the first party and a second party, the first signature is generated based on a first private key of the first party, and the first NLP address is a first public key of the first party; sending the key negotiation message to the second party, for the second party to verify an identity of the first party by using the first signature and the first NLP address, store a first temporary public key after the verification is successful, and generate a response message including a second signature, a second NLP address and a second temporary public key; where the second signature is generated based on a second private key of the second party, the second NLP address is a second public key of the second party, the second party also uses the NLP stack; receiving the response message, verifying an identity of the second party by using the second signature and the second NLP address, calculating a first temporary private key corresponding to the first temporary public key and a second temporary public key according to elliptic curve Diffie-Hellman key exchange (ECDH) to obtain a shared key after the verification is successful, and using the shared key for encrypted transmission of data during data interaction with the second party.

Based on this method, according to the NLP stack, communication security can be improved.

In a possible implementation, before generating the key negotiation message including the first signature, the first NLP address and the first temporary public key, the method further includes: generating a first temporary key pair according to the ECDH; using a public key in the first temporary key pair as the first temporary public key; using a private key in the first temporary key pair as the first temporary private key.

In a possible implementation, before generating the key negotiation message including the first signature, the first NLP address and the first temporary public key, the method further includes: generating the first private key randomly, and generating the first public key by using an asymmetric encryption algorithm and the first private key.

In a possible implementation, the generating the key negotiation message including the first signature, the first NLP address and the first temporary public key, includes: obtaining a second NLP address from the data transmission request; resolving the second NLP address to obtain a second physical address of the second party; encrypting partial header information at least including the first temporary public key and a time stamp in the key negotiation message by using the first private key, to obtain the first signature; where the time stamp is used for verifying timeliness of the key negotiation message; encapsulating the first signature, the first NLP address, the first physical address of the first party, the second NLP address, the second physical address, and the first temporary public key into the key negotiation message.

In a possible implementation, the partial header information includes an NLP basic header and an NLP extension header of the key negotiation message; or, a partial header in the NLP basic header and the NLP extension header.

In a possible implementation, the verifying the identity of the second party by using the second signature and the second NLP address, includes: verifying the second signature by using the second NLP address; determining that the identity of the second party is verified successfully based on that the verification is successful; determining that the verification of the identity of the second party fails, and discarding the response message, based on that the second signature fails to be verified by using the second NLP address.

In a possible implementation, the using the shared key for encrypted transmission of data during data interaction with the second party, includes: obtaining to-be-transmitted data from the data transmission request when sending the to-be-transmitted data to the second party; encrypting the to-be-transmitted data by using a symmetric encryption algorithm with a characteristic of Authenticated Encryption with Associated Data (AEAD) and the shared key, to obtain encrypted to-be-transmitted data; where the to-be-transmitted data is multilayer data above a network layer in the NLP stack of the first party; encapsulating the encrypted to-be-transmitted data into a first NLPSec message, and sending the first NLPSec message to the second party; after receiving a second NLPSec message sent from the second party, decrypting and checking for integrity of the encrypted data in the second NLPSec message using the symmetric encryption algorithm and the shared key, and transmitting the decrypted data to a transport layer in the NLP stack of the first party for processing after the check is successful.

In an eighth aspect, the present application further provides a communication apparatus for implementing the method in the first aspect and any possible implementation thereof.

In a possible implementation, the apparatus includes: an MAC address obtaining module, configured to obtain an MAC address of a second party according to a data transmission request from an application layer, where the data transmission request includes an NLP address of the second party.

In a possible implementation, the apparatus includes: a key generating module, configured to generate a first temporary key pair, where the first temporary key pair includes a first temporary public key and a first temporary private key.

In a possible implementation, the key generating module is further configured to obtain a second temporary public key of the second party according to the first temporary public key, and generate a shared key according to the second temporary public key and the first temporary private key.

In a possible implementation, the apparatus includes: a determining module, configured to determine a data message, where the data message carries the MAC address of the second party and encrypted data obtained by encrypting using the shared key, and a receiving party of the data message is the second party.

In a ninth aspect, the present application further provides a communication apparatus for implementing the method in the second aspect and any possible implementation thereof.

In a possible implementation, the apparatus includes: an obtaining module, configured to obtain a first temporary public key of a first party.

In a possible implementation, the apparatus includes: a key generating module, configured to generate a second temporary key pair, where the second temporary key pair includes a second temporary public key and a second temporary private key.

In a possible implementation, the key generating module is further configured to generate a shared key according to the first temporary public key and the second temporary private key.

In a possible implementation, the apparatus includes: a message generating module, configured to generate a message carrying the second temporary public key, where a receiving party of the message is the first party, and the second temporary public key is used for the first party to generate the shared key.

In a possible implementation, the apparatus includes: a decrypting module, configured to decrypt encrypted data carried in a data message according to the shared key, where a sending party of the data message is the first party, and the data message further carries an MAC address of the second party.

In a tenth aspect, the present application further provides a communication apparatus, applied to a first party, where the first party uses a new link protocol (NLP) stack.

In a possible implementation, the apparatus includes: a message sending module, configured to send an address resolution request message, where a source address of the address resolution request message is an NLP address of the first party, a destination address of the address resolution request message is an NLP address of a second party, the address resolution request message includes an MAC address of the first party and a first signature, the first signature is generated based on a first private key of the first party, and the NLP address of the first party is a public key corresponding to the first private key.

In a possible implementation, the apparatus includes: a message receiving module, configured to receive a first response message from the second party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key.

In a possible implementation, the apparatus includes: a storing module, configured to store a corresponding relationship between the NLP address of the second party and the MAC address of the second party, after determining that the second signature has been verified according to the NLP address of the second party.

In an eleventh aspect, the present application further provides a communication apparatus, applied to a second party, where the second party uses a new link protocol (NLP) stack.

In a possible implementation, the apparatus includes: a message receiving module, configured to receive an address resolution request message from a first party, where a source address of the address resolution request message is an NLP address of the first party, a destination address of the address resolution request message is an NLP address of the second party, the address resolution request message includes an MAC address of the first party and a first signature, the first signature is generated based on a first private key of the first party, and the NLP address of the first party is a public key corresponding to the first private key.

In a possible implementation, the apparatus includes: a message sending module, configured to send a first response message, after determining that the first signature has been verified according to the NLP address of the first party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key.

In a twelfth aspect, the present application further provides a communication apparatus for implementing the method in the third aspect and any possible implementation thereof.

In a possible implementation, the apparatus includes: a message sending module, configured to send an address resolution request message, where a source address of the address resolution request message is an NLP address of the first party, a destination address of the address resolution request message is an NLP address of a second party, the address resolution request message includes an MAC address of the first party and a first signature, the first signature is generated based on a first private key of the first party, and the NLP address of the first party is a public key corresponding to the first private key.

In a possible implementation, the apparatus includes: a message receiving module, configured to receive a first response message from the second party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key.

In a possible implementation, the apparatus includes: a storing module, configured to store a corresponding relationship between the NLP address of the second party and the MAC address of the second party, after determining that the second signature has been verified according to the NLP address of the second party.

In a thirteen aspect, the present application further provides a communication apparatus for implementing the method in the fourth aspect and any possible implementation thereof.

In a possible implementation, the apparatus includes: a message receiving module, configured to receive an address resolution request message from a first party, where a source address of the address resolution request message is an NLP address of the first party, a destination address of the address resolution request message is an NLP address of the second party, the address resolution request message includes an MAC address of the first party and a first signature, the first signature is generated based on a first private key of the first party, and the NLP address of the first party is a public key corresponding to the first private key.

In a possible implementation, the apparatus includes: a message sending module, configured to send a first response message, after determining that the first signature has been verified according to the NLP address of the first party, where the first response message is a response message corresponding to the address resolution request message, a source address of the first response message is the NLP address of the second party, a destination address of the response message is the NLP address of the first party, the first response message includes an MAC address of the second party and a second signature, the second signature is generated based on a second private key of the second party, and the NLP address of the second party is a public key corresponding to the second private key.

In a fourteenth aspect, the present application further provides an apparatus for source address authentication for implementing the method in the fifth aspect and any possible implementation thereof.

In a possible implementation, the apparatus includes: an encapsulating unit, configured to encapsulate a signature of the sending party, an NLP source address, to-be-sent data, a serial number for preventing replay attack and an NLP destination address into an NLP data packet according to a data transmission request; where the signature of the sending party is generated using a sending party private key of the sending party, the NLP destination address is a receiving party public key of a receiving party, the NLP source address is a sending party public key of the sending party, and the receiving party uses a new link protocol (NLP) stack.

In a possible implementation, the apparatus includes: a sending unit, configured to send the NLP data packet to the receiving party, for the receiving party to verify the signature of the sending party using the NLP source address, and record the serial number based on that the verification is passed, and obtain the to-be-sent data.

In a possible implementation, the apparatus further includes: a generating unit configured to: generate the sending party private key randomly; generate the sending party public key based on an asymmetric encryption algorithm and the sending party private key.

In a possible implementation, the encapsulating unit is further configured to obtain the NLP destination address and the to-be-sent data from the data transmission request; resolve the NLP destination address to obtain a receiving party physical address of the receiving party; encrypt partial header information at least including the serial number and a random number in the NLP data packet by using the sending party private key, to obtain the signature of the sending party; encapsulate the signature of the sending party, the NLP source address, the sending party physical address of the sending party, the NLP destination address, the receiving party physical address and the to-be-sent data into the NLP data packet.

In a possible implementation, a plurality of serial numbers in a plurality of data packets continuously sent from the sending party to the receiving party are set in an ascending order. In a possible implementation, the serial number includes a time stamp.

In a fifteenth aspect, the present application further provides an apparatus for source address authentication for implementing the method in the sixth aspect and any possible implementation thereof.

In a possible implementation, the apparatus includes: a receiving unit, configured to receive an NLP data packet sent from a sending party; where the NLP data packet is obtained by encapsulating a signature of the sending party, an NLP source address, to-be-sent data, a serial number for preventing replay attack and an NLP destination address, the signature of the sending party is generated using a sending party private key of the sending party, the NLP destination address is a receiving party public key of the receiving party, the NLP source address is a sending party public key of the sending party, and the sending party also uses a new link protocol (NLP) stack.

In a possible implementation, the apparatus includes: an obtaining unit, configured to obtain the NLP source address, the signature of the sending party and the serial number from the NLP data packet.

In a possible implementation, the apparatus includes: a verifying unit, configured to verify authenticity and non-repeatability of a source of the NLP data packet based on the NLP source address, the signature of the sending party and the serial number, store the serial number and obtain the to-be-sent data based on that the verification passes, and discard the NLP data packet based on that the verification fails.

In a possible implementation, the verifying unit is further configured to verify the signature of the sending party using the NLP source address, determine that a source of the NLP data packet is the sending party based on that the verification is successful; determine whether the serial number for preventing replay attack is greater than a serial number in an NLP data packet previously received from the sending party, determine that the NLP data packet is not repetitive based on that the serial number for preventing replay attack is greater than the serial number in the NLP data packet previously received.

In a sixteenth aspect, the present application further provides a communication apparatus, applied to a first party.

In a possible implementation, the apparatus includes: a generating unit, configured to generate a key negotiation message including a first signature, a first NLP address and a first temporary public key according to a data transmission request; where the key negotiation message is used for identity authentication and key exchange between the first party and the second party, the first signature is generated based on a first private key of the first party, and the first NLP address is a first public key of the first party.

In a possible implementation, the apparatus includes: a verifying unit, configured to send the key negotiation message to the second party, for the second party to verify an identity of the first party by using the first signature and the first NLP address, store a first temporary public key after the verification is successful, and generate a response message including a second signature, a second NLP address and a second temporary public key; where the second signature is generated based on a second private key of the second party, the second NLP address is a second public key of the second party, the second party also uses the NLP stack.

In a possible implementation, the apparatus includes: a transmission unit, configured to receive the response message, verify an identity of the second party by using the second signature and the second NLP address, calculate a first temporary private key corresponding to the first temporary public key and a second temporary public key according to elliptic curve Diffie-Hellman key exchange (ECDH) to obtain a shared key after the verification is successful, and use the shared key for encrypted transmission of data during data interaction with the second party.

In a seventeenth aspect, the present application further provides a computer-readable storage medium, storing a computer program or instruction thereon, where the computer program or instruction, when being run on a computer, enable the computer to implement the methods described in the first to seventh aspects and any possible implementation thereof.

In a eighteenth aspect, the present application further provides a chip including a processor and may further include a memory, where the processor is coupled with the memory for executing a computer program or instruction stored in the memory, enabling the chip to implement the methods described in the first or seventh aspect and any possible implementation thereof.

BRIEF DESCRIPTION OF FIGURES

In order to illustrate technical solutions in embodiments of the present application more clearly, accompanying drawings that need to be used in describing embodiments will be introduced below briefly. Obviously the accompanying drawings described below are only some embodiments of the present application, and other accompanying drawings can also be obtained by those ordinary skilled in the art according to these accompanying drawings without creative labor.

FIG. 1 is a schematic diagram of an encapsulation structure of an NLP data packet according to an embodiment of the present application;

FIG. 2 is a schematic structural diagram of an NLP basic header in an NLP data packet according to an embodiment of the present application;

FIG. 3 is a schematic structural diagram of an NLPKey extension header according to an embodiment of the present application;

FIG. 4 is a schematic structural diagram of an NLPSec extension header according to an embodiment of the present application;

FIG. 5 is a schematic structural diagram of a VARP packet structure according to an embodiment of the present application;

FIG. 6 is a schematic structural diagram of a key negotiation message according to an embodiment of the present application;

FIG. 7 is a schematic structural diagram of an NLPSec package according to an embodiment of the present application;

DETAILED DESCRIPTION

Figure 8A:
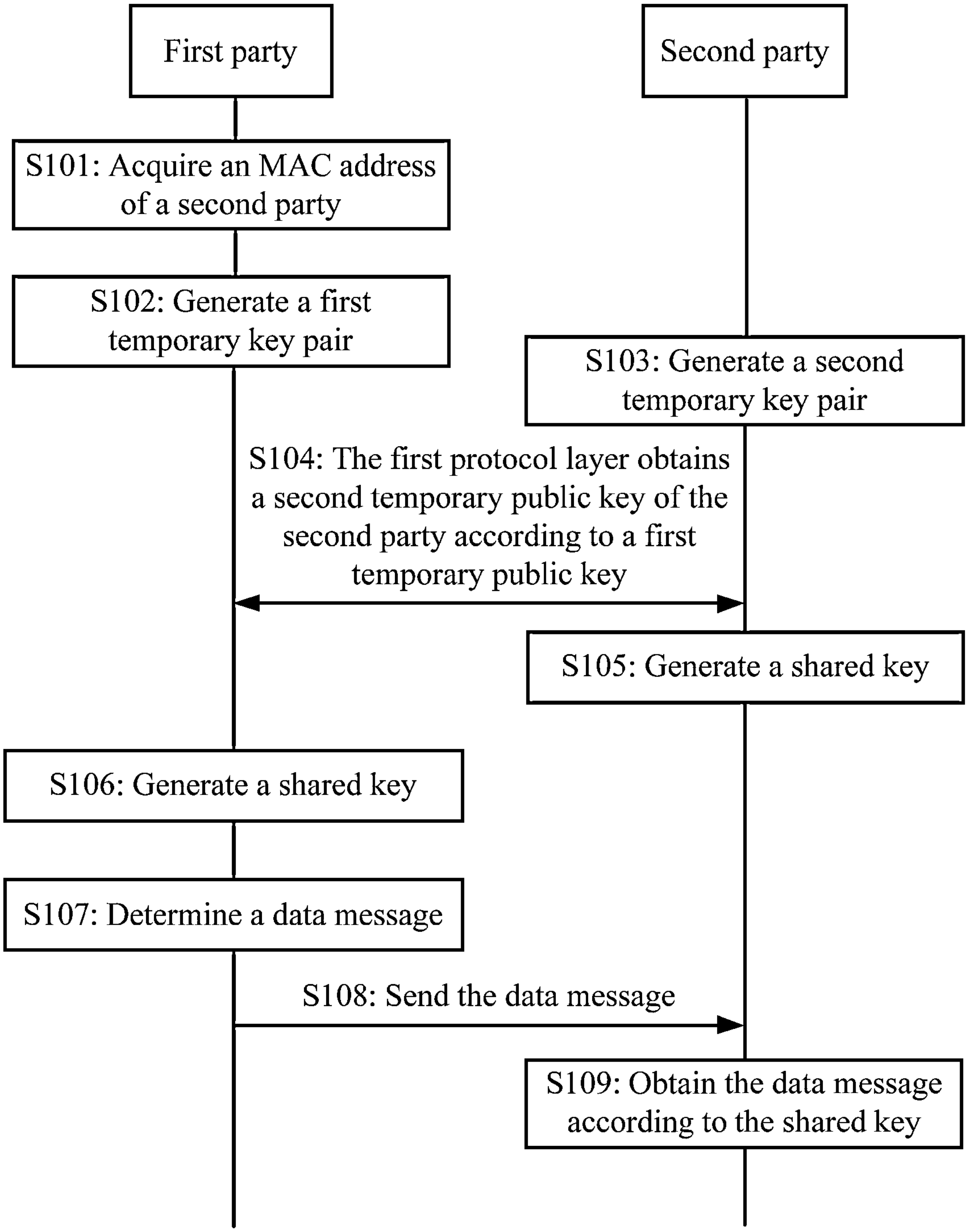
FIG. 8A is a process schematic diagram of a communication method according to an embodiment of the present application.

For making objectives, technical solutions and advantages of the present application clearer, the present application will be further clearly described below in conjunction with accompanying drawings. Apparently, embodiments described are some rather than all of embodiments of the present application. Based on embodiments of the present application, all other embodiments obtained by those of ordinary skilled in the art without making creative efforts fall within the scope of protection of the present application.

In order to improve the communication security and reduce the risk of data transmission, embodiments of the present application provide an encrypted communication method, apparatus, device and storage medium.

In order for those skilled in the art to fully understand the present application, a brief description of the NLP protocol stack is provided.

TABLE 1

Table 1 is a schematic structural diagram of an NLP protocol stack according to an embodiment of the present application.

| Layer ID | Layer name | Communication protocol to be followed | |
|---|---|---|---|
| LAYER5 | Application layer | | For example, Hyper Text Transfer Protocol (HTTP) |
| | NLP Communication Interface (NLP Socket API) | | |
| LAYER4 | Transport layer | TCP | Transmission Protocol (TP) |
| LAYER3 | Network layer | NLP | Public Key Address Resolution Protocol (VNET Address Resolution Protocol, VARP) |
| LAYER2 | Data link layer | | Ethernet (ETH) protocol |
| PHY | Physical layer | | |

The NLP protocol stack is equivalent to changing the IP protocol used by the network layer in the traditional IP protocol stack into the NLP protocol. The network address used by both communication parties in the NLP protocol stack is an NLP address, and the NLP address is a locally generated 32-byte public key.

Data packets generated through the NLP protocol stack are called NLP data packets, and messages generated through the NLP protocol stack are called NLP protocol messages.

VARP is an extension of the ARP protocol used to resolve the mapping between NLP addresses and MAC addresses. The request and response ARP packet based on the NLP address is referred to herein as a VARP packet. In order to achieve security and prevent ARP spoofing, a signature is added after the VARP header, and the content of the signature can be first 88 bytes of the VARP header, for authentication. The signature can be generated by encryption with the private key.

FIG. 1 is a schematic diagram of an encapsulation structure of an NLP data packet according to an embodiment of the present application.

The NLP data packet includes an Ethernet header (occupying 14 bytes), an NLP basic header (occupying 72 bytes), an NLP extension header (optional), a transport layer header (the length of the occupied bytes can be set according to actual requirements, that is, the length is not fixed), and data (the length is not fixed).

FIG. 2 is a schematic structural diagram of an NLP basic header in an NLP data packet according to an embodiment of the present application.

The NLP basic header may include following fields:

version (occupying 1 byte), indicating the NLP protocol version used;

service (occupying 1 byte), indicating the type of service provided, similar to the ToS field in IP;

flow label (occupying 2 bytes), marking the data flow type of the message, which can be configured to quality service;

packet length (occupying 2 bytes), including the length of the NLP basic header, the length of the NLP extension header, and the length of the data;

next header (occupying 1 byte), indicating the next extension header or upper layer protocol type;

hop count (occupying 1 byte), indicating the number of times an NLP data packet is limited to be forwarded;

NLP source address (occupying 32 bytes), indicating the NLP address of the sending party;

NLP destination address (occupying 32 bytes), indicating the NLP address of the receiving party.

The NLP extension header in the NLP data packet may include an NLPKey extension header, an NLPSec extension header, and the like.

FIG. 3 is a schematic structural diagram of an NLPKey extension header according to an embodiment of the present application.

The NLPKey extension header includes following fields:

next header (occupying 1 byte), indicating the next extension header or upper layer protocol type;

type (occupying 1 byte), indicating whether the NLP data packet is of the request type or the response type, for example, the active connection party (sending party) sends a request, and the passive connection party (receiving party) returns a response;

reserved (occupying 2 bytes), indicating a reserved position for subsequent use when required;

time stamp (occupying 4 bytes), for confirming the timeliness of the NLP data packet;

temporary public key (occupying 32 bytes), which is temporarily generated during the interaction between the two communication parties and is used to exchange public keys with the opposite end, to calculate the shared key, where the temporary key pair generated by the protocol stack includes a temporary public key, and the temporary key pair and the shared key are bound with the opposite end;

digital signature (occupying 64 bytes), generally encrypting and signing the first 40 bytes of the extension header to authenticate identity, while also ensuring the integrity of the content of the extension header.

FIG. 4 is a schematic structural diagram of an NLPSec extension header according to an embodiment of the present application.

The NLPSec extension header includes:

next header (occupying 1 byte), indicating the next extension header or upper layer protocol type;

reserved (occupying 1 byte), indicating a reserved position for subsequent use when required;

encrypted data length (occupying 2 bytes), indicating the length of the encrypted data;

serial number (occupying bytes), ensuring that even the same original data is transmitted (such as retransmission), where because serial numbers are different, ciphertext (encrypted data) is different.

FIG. 5 is a schematic structural diagram of a VARP packet structure according to an embodiment of the present application.

The VARP packet structure may include fields such as hardware type (occupying 2 bytes), protocol (occupying 2 bytes), hardware address size (occupying 1 byte), address size (1 byte), request type (2 bytes), and time stamp+signature (4+64 bytes).

In addition, the VARP packet structure may further include:

source MAC address (occupying 6 bytes), indicating the MAC address of the sending party;

NLP source address (occupying 32 bytes), indicating the NLP address of the sending party;

destination MAC address (occupying 6 bytes), indicating the MAC address of the receiving party;

NLP destination address (occupying 32 bytes), indicating the NLP address of the receiving party.

FIG. 6 is a schematic structural diagram of a key negotiation message according to an embodiment of the present application.

The key negotiation message may include an Ethernet header, an NLP basic header, and an NLPKey extension header, where the NLPKey extension header occupies 104 bytes.

FIG. 7 is a schematic structural diagram of an NLPSec package according to an embodiment of the present application.

The NLPSec data packet refers to that an NLP extension header in the NLP data packet is an NLPSec extension header occupying 8 bytes, a transport layer header is not included, and data of the transport layer header is taken as a part of the data and is encrypted together, to obtain encrypted data, where the encrypted data is to encrypt the data above layer3 in the NLP protocol stack.

The NLPSec package may include an Ethernet header (occupying 2 bytes), an NLP basic header (occupying 2 bytes), an NLPSec extension header (occupying 2 bytes) and encrypted data (occupying 2 bytes).

The communication process provided by the present application will be described below in combination with method embodiments.

FIG. 8A is a process diagram of a communication method according to an embodiment of the present application, and the process may be performed by a first party and a second party. The first party may be a sending party of the encrypted data and the second party may be a receiving party of the encrypted data.

The process includes following steps.

S101: a first protocol layer of the first party obtains an MAC address of a second party according to a data transmission request from an application layer, where the data transmission request includes an NLP address of the second party.

The application layer invokes an API interface of the first protocol layer of the first party or other transport layer protocols, a data transmission request of an upper layer protocol or application is received on the interface, and the data transmission request may be configured to request sending data to the second party. The data transmission request includes the NLP address of the second party and data content. The API interface may be a Socket-like interface, which is an interface that communicates based on an NLP address rather than an IP address.

In a possible implementation, for example, the first protocol layer of the first party determines the MAC address of the second party according to the data transmission request. The first protocol layer of the first party determines whether a data transmission connection between the first party and the second party exists, and if the data transmission connection between the first party and the second party exists, S107 is performed. If the data transmission connection between the first party and the second party does not exist, proceed to the next step.

In the present application, a data transmission connection (referred to as a connection for short) refers to an encrypted communication connection established between the first party and the second party after a shared key for encrypting data is obtained, and the connection is used for transmission of encrypted data between the first party and the second party. During the encrypted communication between the first party and the second party, if the sending party of the first party and the second party determines that the connection exists, the shared key can be configured to communicate without having to retrieve the shared key, and accordingly, the receiving party of the first party and the second party may use the shared key for decryption of the data. Optionally, the connection may be dropped due to, for example, a timeout in the setup time.

In another possible implementation, the first protocol layer may determine the MAC address of the second party based on the NLP address of the second party and a first corresponding relationship. The first corresponding relationship includes a corresponding relationship between NLP addresses and MAC addresses of a plurality of devices. The plurality of devices includes, but is not limited to, a first party and/or a second party. The first corresponding relationship may be obtained by the first protocol layer according to historical communication records, for example, the first party records a corresponding relationship between an NLP address and an MAC address of a counterpart device every time the first party communicates with the device, and stores the corresponding relationship into the first corresponding relationship. When communication is carried out next time, the first protocol layer may query the counterpart device from the first corresponding relationship.

In the present application, the first corresponding relationship may be stored in the form of a neighbor list. If the first protocol layer is able to determine the MAC address of the second party by querying the neighbor list, the shared key may be obtained according to the MAC address of the second party, and the process of obtaining the shared key may refer to the description in the present application.

Optionally, in the present application, both the first party and the second party have NLP addresses. The NLP address can be determined by randomly generating a private key (32 bytes), and then generating a public key (32 bytes) through the elliptic curve cryptography algorithm ED25519. The generated public key is the NLP address.

Optionally, the first protocol layer may be a network layer of the first party, or may be another protocol layer.

Optionally, the first protocol layer generates an address resolution request message, and a source address of the address resolution request message is the NLP address of the first party. A destination address of the address resolution request message is the NLP address of the second party. The address resolution request message includes an MAC address of the first party and a first signature. The first signature is generated according to a first private key of the first party. The NLP address of the first party is a public key corresponding to the first private key. The first protocol layer obtains a first response message from the second party, where the first response message is a response message corresponding to an address resolution request message. A source address of the first response message is the NLP address of the second party. A destination address of the first response message is the NLP address of the first party. The first response message includes an MAC address of the second party and a second signature, the second signature is generated according to a second private key of the second party. The NLP address of the second party is the public key corresponding to the second private key. The first protocol layer obtains the MAC address of the second party after determining that the second signature has been verified according to the NLP address of the second party.

The address resolution request message may be a VARP request message, and the first response message may be a VARP response message. At this time, the first protocol layer of the first party can construct a VARP request message and send the message to the second party. The format of the message follows the VARP packet structure described above. The VARP request message includes the NLP address of the first party, the NLP address of the second party, the MAC address of the first party (as the source address), a broadcast MAC address (as the destination address), a serial number, and the first signature. The second protocol layer of the second party receives the VARP request message, uses the NLP address of the first party as a public key to verify the first signature. If the verification is successful, the first corresponding relationship of the first party is saved, that is, the corresponding relationship between the NLP address of the first party and the MAC address of the first party is saved. If the verification fails, the message is discarded, and the process ends. The second protocol layer constructs and sends a VARP response message, and the format of the message follows the VARP packet structure described above. The VARP response message includes the NLP address of the second party, the NLP address of the first party, the MAC address of the second party (as the source address), the MAC address of the first party (as the destination address), the serial number, and the second signature. The first protocol layer receives the VARP response message and uses the NLP address of the second party as a public key to verify the second signature. If the verification is successful, the first corresponding relationship of the second party is saved, that is, the corresponding relationship between the NLP address and the MAC address of the second party is saved. If the verification fails, the message is discarded, and the process ends. At this point, address resolution is complete.

Optionally, the second protocol layer may be a network layer of the second party, or may be another protocol layer.

Optionally, taking the first signature generated by the first protocol layer as an example, the first signature is generated according to the private key of the first party and to-be-signed content. The first signature occupies 64 bytes. The to-be-signed content may include 88 bytes, including a hardware type, a protocol, a hardware address size, an address size, a request type, a source MAC address, an NLP source address, a destination MAC address, an NLP destination address, and a time stamp as shown in FIG. 5.

Optionally, the first protocol layer and the second protocol layer may set an invalidation mechanism for the shared key by binding the temporary key pairs generated respectively by the first protocol layer and the second protocol layer with the shared key, in combination with the set time stamp. For example, when invalidation time corresponding to the time stamp is reached, both parties are forced to renegotiate to generate a new shared key for data transmission. For example, if the time stamp is set to 30 minutes, the validity time of the shared key generated by the key negotiation message is 30 minutes. In addition, the key negotiation message for carrying the latest temporary key pair can also be identified according to time stamps in different key negotiation messages.

Optionally, before S101, the first protocol layer may determine whether a connection between the first party and the second party exists (or, determine whether the first party stores a shared key used by the first party and the second party, the shared key can be generated by referring to the introduction in the application). If the connection between the first party and the second party exists, the encryption transmission can be performed according to the shared key, that is, S101 is skipped and S107 is performed. If the connection between the first party and the second party does not exist, the first protocol layer may further query the neighbor list according to the NLP address of the second party to determine whether the MAC address of the second party is stored. If the MAC address of the second party is stored, reobtaining the shared key may be performed, that is, S101 is skipped and S102 is performed. If neither the connection nor the MAC address of the second party exists, the first protocol layer may need to obtain the MAC address of the second party, and S101 is performed.

S102: the first protocol layer generates a first temporary key pair, and the first temporary key pair includes a first temporary public key and a first temporary private key. The first temporary key pair is randomly generated.

Optionally, the elliptic curve X25519 may be configured to generate the first temporary key pair.

Optionally, S102 may be performed before S101.

S103: a second protocol layer of the second party generates a second temporary key pair, and the second temporary key pair includes a second temporary public key and a second temporary private key.

The second temporary key pair is randomly generated.

The method in which the second protocol layer generates the second temporary key pair may refer to the method in which the first protocol layer of the first party generates the first temporary key pair. Optionally, the second protocol layer may use the elliptic curve X25519 to generate the second temporary key pair according to the MAC address of the second party.

Optionally, the second protocol layer may be a transport layer protocol of the second party, or may be another protocol layer.

S103 may also be performed before S101 or S102, which is not limited herein.

S104: the first protocol layer obtains the second temporary public key of the second party according to the first temporary public key.

Correspondingly, the second protocol layer obtains the first temporary public key from the first protocol layer. For example, after the second protocol layer obtains the first temporary public key from the first party, the second temporary public key is generated and sent through the physical layer of the second party. In addition, the second protocol layer may also generate the second temporary public key before obtaining the first temporary public key.

Optionally, the way for the first protocol layer to obtain the second temporary public key of the second party according to the first temporary public key may be that the first protocol layer sends a key negotiation request message to the second protocol layer, and receives a response message corresponding to the key negotiation request message and carrying the second temporary public key, to obtain the second temporary public key. The key negotiation request message and the response message may be NLPKey request messages. The key negotiation request message may carry the first temporary public key, and the second protocol layer may obtain the first temporary public key.

The first protocol layer may construct and send an NLPKey request message through the physical layer of the first party, and the format of the NLPKey request message is encapsulated according to the format of the key negotiation message shown in FIG. 6. The NLPKey request message may carry the NLP address of the second party, the MAC address of the second party, the NLP address of the first party, the MAC address of the first party, the first temporary public key, a third signature, and a time stamp. The second protocol layer can receive the NLPKey request message through the physical layer of the second party and send the NLPKey response message, and the format of that NLPKey response message can be encapsulated according to the format of the key negotiation message shown in FIG. 6. The NLPKey response message may carry the NLP address of the first party, the MAC address of the first party, the NLP address of the second party, the MAC address of the second party, the second temporary public key, a fourth signature, and a time stamp. The first protocol layer receives the NLPKey response message and obtains the second temporary public key. Through the above steps, the first party and the second party can realize the exchange of the first temporary public key and the second temporary public key.

S105: the second protocol layer generates a shared key according to the first temporary public key and the second temporary private key.

After the second protocol layer receives the NLPKey request message in S104, the NLP address of the first party in the message can be used as the public key to verify the signature. If the verification is successful, the second protocol layer determines the shared key according to the second temporary private key and the first temporary public key.

Optionally, based on S104 and S105, the message including the NLPKey extension header is used at least twice during the generation of the shared key, to further improve safety.

Optionally, a timeout mechanism can be set to force the key to be updated, to avoid information lag caused by the binding of the temporary key pair and the shared key with the opposite end. For example, after the shared key is generated for a certain period of time, the shared key may be considered to be invalid. After that, the first party and the second party can regenerate the shared key according to the above process in the process of encryption transmission.

Optionally, the second protocol layer may determine the shared key based on an Elliptic Curve Diffie-Hellman key Exchange (ECDH) principle.

S106: the first protocol layer generates a shared key according to the second temporary public key and the first temporary private key.

After the first protocol layer receives the NLPKey response message in S104, the signature may be verified using the NLP address of the second party in the message as the public key. If the verification is successful, the first protocol layer determines the shared key according to the first temporary private key and the second temporary public key.

Optionally, the first protocol layer may determine the shared key according to the ECDH principle.

Therefore, both the first protocol layer and the second protocol layer can generate the shared key according to the ECDH principle, that is, the shared key generated by the first protocol layer and the shared key generated by the second protocol layer are equal.

Optionally, the execution order of S105 and S106 is not limited herein.

S107: the first protocol layer determines a data message carrying encrypted data obtained by encrypting using the shared key, and the receiving party of the data message is the second party.

Optionally, the encrypted data may be data above layer3, for example, the transport layer header is also encapsulated into the encrypted data. The first protocol layer uses the shared key to encrypt to-be-transmitted data and encapsulates the to-be-transmitted data into a first NLPSec message. The format of the first NLPSec message is encapsulated according to an NLPSec packet, and the NLP data packet includes an Ethernet header, an NLP basic header, an NLPSec extension header and encrypted data.

It should be understood that after the first protocol layer and the second protocol layer respectively obtain the shared key, the data interaction process between the first party and the second party may be that the first protocol layer and the second protocol layer respectively perform data encryption/decryption according to the shared key.

Optionally, the encrypted data may be obtained by the chacha20-poly 1305 algorithm, the algorithm is an Authenticated Encryption with Associated Data (AEAD) algorithm, and has an encryption form with confidentiality and integrity.

S108: the first protocol layer sends the data message, and the receiving party of the data message is the second party.

The first protocol layer sends the constructed NLPSec message to the second party.

S109: the second protocol layer decrypts the encrypted data carried in the data message according to the shared key.

The second protocol layer receives the NLPSec message, uses the shared key to decrypt the data and verify the integrity, and delivers decrypted data to an upper layer transport layer protocol for processing if the integrity verification is successful.

In the Internet, the network transport layer protocol generally uses the Transmission Control Protocol (Transmission Control Protocol/Internet Protocol, TCP/IP), and all data of the transport layer such as TCP, User Datagram Protocol (UDP) and other transport layer protocols are directly encapsulated into IP data packets for transmission. When data is transmitted in a link layer using the TCP/IP protocol, the Address Resolution Protocol (ARP) is used for address resolution. However, an attacker can send a pseudo ARP response message corresponding to a host, so that the information send by the host does not reach the intended host or reaches the wrong host, which constitutes an ARP spoofing. Therefore, embodiments of the present application further provide another communication method, for preventing ARP spoofing and improving the security of network communication.

Figure 8B:
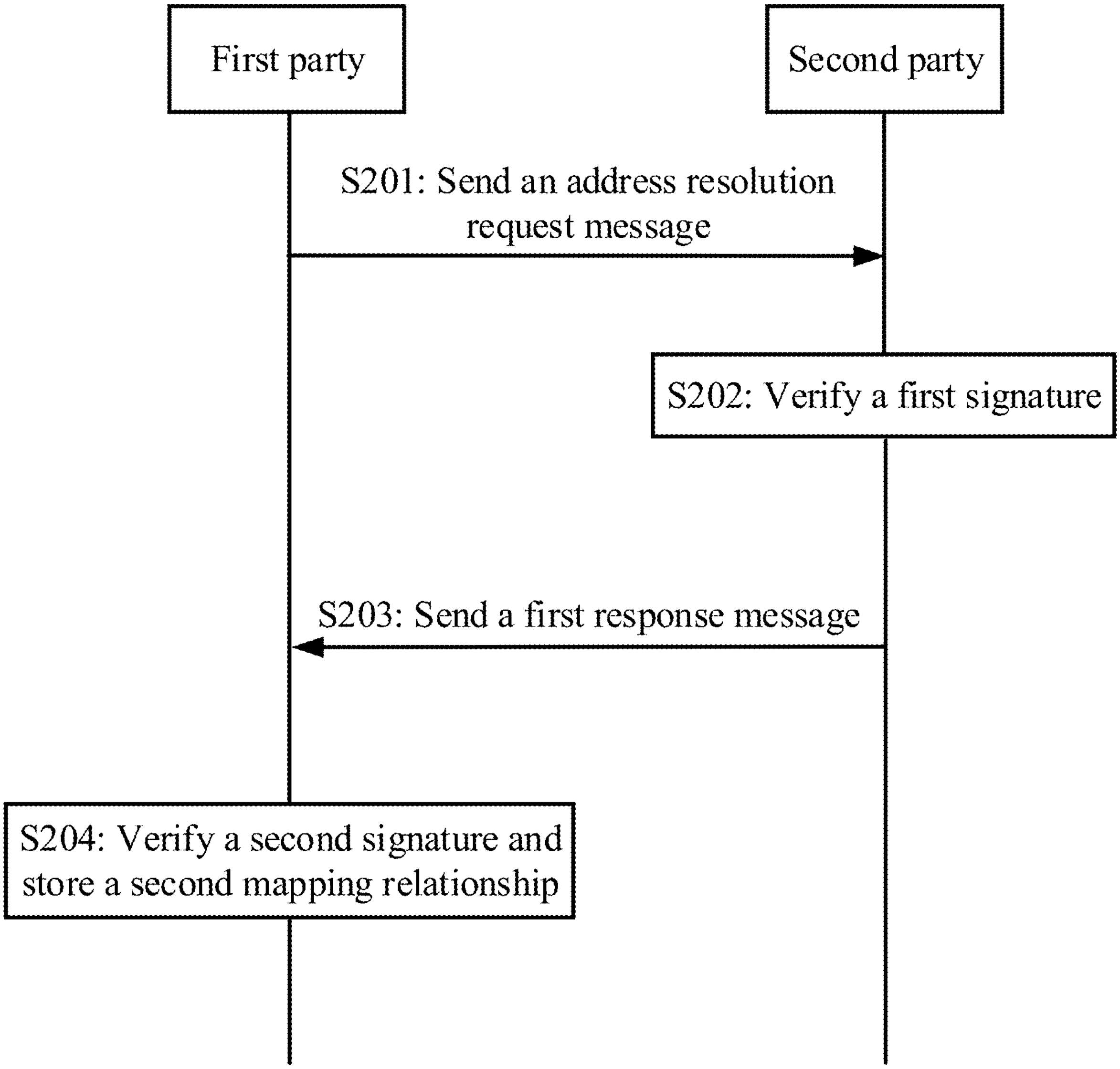
FIG. 8B is a schematic process diagram of another communication method according to an embodiment of the present application.

FIG. 8B is a schematic process diagram of another communication method according to an embodiment of the present application. This process may be performed by the first party and the second party shown in FIG. 8B. The first party and the second party shown in FIG. 8B use a new link protocol (NLP) stack. The first party may be a sending party of the encrypted data and the second party may be a receiving party of the encrypted data. For example, the first party may obtain the MAC address of the second party according to the communication method to send the encrypted data based on the MAC address of the second party, before sending the encrypted data.

Optionally, the first party and the second party as shown in FIG. 8B communicate using an NLP protocol stack, and the process includes following steps.

S201: the first party sends an address resolution request message, and a receiving party of the address resolution request message is the second party. The source address of the address resolution request message is the NLP address of the first party, the destination address of the address resolution request message is the NLP address of the second party, the address resolution request message includes an MAC address of the first party and a first signature, the first signature is generated according to a first private key of the first party, and the NLP address of the first party is the public key corresponding to the first private key.

In a possible implementation, the address resolution request message uses a public key address resolution protocol (VNET Address Resolution Protocol, VARP) for encapsulation, that is, the address resolution request message may be a VARP message. The first party may encrypt to-be-signed content in the address resolution request message according to the first private key to obtain a first signature. VARP is an extension of the Address Resolution Protocol (ARP), and is used to analyze a mapping relationship between an NLP address and an MAC address, and add a signature after a VARP header for identity authentication.

FIG. 5 is a schematic structural diagram of a VARP message according to an embodiment of the present application.

By way of example, in connection with FIG. 5, the first signature may be generated according to the first private key of the first party and the to-be-signed content. The first signature occupies 64 bytes. For example, the to-be-signed content may include 88 bytes, including a hardware type, a protocol, a hardware address size, an address size, a request type, a source MAC address, an NLP source address, a destination MAC address, an NLP destination address, and a time stamp.

Optionally, the first party shown in FIG. 8B may sign the entire VARP header, and may also sign any combination of fields in the message.

In a possible implementation, the to-be-signed content includes a time stamp, and the time stamp is used to verify the timeliness of the address resolution request message.

As shown in FIG. 8B, the first party may set a time stamp for the ARP message. That is, an invalidation mechanism may be set for the communication. For example, when an invalidation time corresponding to the time stamp is reached, the first party is forced to reconstruct the address resolution request message. For example, if the time stamp is set to 30 minutes, the validity time of the address resolution request message is 30 minutes. In addition, the address resolution request message for carrying the latest data information may also be identified according to time stamps in different address resolution request messages.

Optionally, the time stamp in the VARP message can be replaced by a monotonically increasing serial number of any form and having different byte quantities, to prevent replay attacks.

Optionally, before the first party sends the address resolution request message to the second party as shown in FIG. 8B, the first party may determine that the MAC address of the second party is not included in a first corresponding relationship according to the NLP address of the second party and the first corresponding relationship. The first corresponding relationship includes a corresponding relationship between NLP addresses and MAC addresses of a plurality of devices. The plurality of devices includes, but is not limited to, a first party and/or a second party. The first corresponding relationship may be obtained by the first party according to historical communication records. For example, the first party records the corresponding relationship between the NLP address and the MAC address of a counterpart device every time the first party communicates with the device. The first party can query the counterpart device from the first corresponding relationship when the communication is performed next time.

In the present application, the first corresponding relationship may be stored in the form of a neighbor list. If the first party can determine the MAC address of the second party by querying the neighbor list, it is not necessary to perform S201 again.

Correspondingly, the second party receives the address resolution request message from the first party.

The source address of the address resolution request message is the NLP address of the first party, the destination address of the address resolution request message is the NLP address of the second party, the address resolution request message includes an MAC address of the first party and a first signature, the first signature is generated according to a first private key of the first party, and the NLP address of the first party is the public key corresponding to the first private key.

S202: the second party verifies the first signature in the address resolution request message according to the NLP address of the first party.

In S202, if the second party successfully verifies the first signature, S204 shown in FIG. 8B is performed, and if the verification fails, the message is discarded, and the process ends.

Optionally, if the first signature is successfully verified, the second party may store a second corresponding relationship and then perform S204. The second corresponding relationship may include a corresponding relationship between the NLP address of the first party and the MAC address of the first party.

S203: the second party sends a first response message, and a receiving party of the first response message is the first party. The first response message is a response message corresponding to the address resolution request message, the source address of the first response message is the NLP address of the second party, the destination address of the first response message is the NLP address of the first party, the first response message includes an MAC address of the second party and a second signature, the second signature is generated according to a second private key of the second party, and the NLP address of the second party is the public key corresponding to the second private key.

For example, the first response message in the present application may use the VARP structure as shown in FIG. 5. The source address of the first response message is the NLP address of the second party, and the destination address of the first response message is the NLP address of the first party.

In a possible implementation, the length of the second private key is 32 bytes, and the second party may randomly generate the second private key. The length of the public key corresponding to the second private key occupies 32 bytes. The public key may be determined based on the second private key and the elliptic curve cryptography algorithm ED25519. The second party may use the public key corresponding to the second private key as the NLP address of the second party.

In a possible implementation, the address resolution request message uses a VARP address resolution protocol message. The second party may encrypt the to-be-signed content in the first response message according to the second private key to obtain a second signature.

For example, referring to FIG. 5, the second signature is generated according to the second private key of the second party and the to-be-signed content, and the second signature occupies 64 bytes. For example, the to-be-signed content may include 88 bytes, including a hardware type, a protocol, a hardware address size, an address size, a request type, a source MAC address, an NLP source address, a destination MAC address, an NLP destination address, and a time stamp.

Optionally, the second party may sign the entire VARP header, and may sign any combination of fields in the message.

In a possible implementation, the to-be-signed content includes a time stamp, and the time stamp is used to verify the timeliness of the address resolution request message.

The second party may set a time stamp for the first response message, that is, may set an invalidation mechanism for the communication. For example, when an invalidation time corresponding to the time stamp is reached, the second party is forced to reconstruct the first response message. For example, if the time stamp is set to 30 minutes, the validity time of the first response message is 30 minutes. In addition, the first response message for carrying the latest data information may also be identified according to time stamps in different first response messages.

Optionally, the time stamp in the VARP message can be replaced by a monotonically increasing serial number of any form and having different byte quantities, to prevent replay attacks.

Accordingly, the first party receives the first response message from the second party. The first response message is a response message corresponding to the address resolution request message. The source address of the first response message is the NLP address of the second party, the destination address of the first response message is the NLP address of the first party, the first response message includes an MAC address of the second party and a second signature, the second signature is generated according to a second private key of the second party, and the NLP address of the second party is the public key corresponding to the second private key.

S204: the first party verifies the second signature according to the NLP address of the second party, and if the verification is successful, a corresponding relationship between the NLP address of the second party and the MAC address of the second party is stored.

In addition, if the verification of the second signature fails, the first party discards the message and ends the process. The corresponding relationship between the NLP address of the second party and the MAC address of the second party may be stored in the first corresponding relationship.

Based on the method, when the first party obtains the MAC address of the second party, the first party and the second party need to verify each other's signature respectively, which can prevent ARP spoofing and other attacks to improve communication security.

Optionally, the actions of the first party in the above S201 to S204 may be implemented by the first protocol layer of the first party, and/or, the actions of the second party in the above S201 to S204 may be implemented by the second protocol layer of the second party. The implementation of the first protocol layer may be the network layer of the first party, or may be another protocol layer. The implementation of the second protocol layer may be the network layer of the second party, or may be another protocol layer. The network layer follows the NLP protocol in the NLP protocol stack.

As shown in Table 1, the NLP protocol stack is equivalent to changing the IP protocol used by the network layer in the traditional IP protocol stack into the NLP protocol. The network address used by both communication parties in the NLP protocol stack is an NLP address, and the NLP address is a locally generated 32-byte public key.

Optionally, in a specific implementation of the above S201, the first protocol layer may generate an address resolution request message. The source address of the address resolution request message is the NLP address of the first party, the destination address of the address resolution request message is the NLP address of the second party, the address resolution request message includes an MAC address of the first party and a first signature, the first signature is generated according to a first private key of the first party, and the NLP address of the first party is the public key corresponding to the first private key. In S203, the first protocol layer may obtain a first response message from the second party. The first response message is a response message corresponding to the address resolution request message, the source address of the first response message is the NLP address of the second party, the destination address of the first response message is the NLP address of the first party, and the first response message includes the MAC address of the second party and the second signature. The second signature is generated according to the second private key of the second party, and the NLP address of the second party is the public key corresponding to the second private key. The first protocol layer obtains the MAC address of the second party after determining that the second signature has been verified according to the NLP address of the second party.

The address resolution request message may be a VARP message, and the first response message may be a VARP response message. At this time, the first protocol layer of the first party can construct a VARP request message and send the message to the second party. The format of the message follows the VARP packet structure described above. The VARP request message includes the NLP address of the first party, the NLP address of the second party, the MAC address of the first party (as the source address), the broadcast MAC address (as the destination address), the serial number, and the first signature. The second protocol layer receives the VARP request message, uses the NLP address of the first party as the public key to verify the first signature. If the verification is successful, the first corresponding relationship of the first party is saved, that is, the corresponding relationship between the NLP address of the first party and the MAC address of the first party is saved. If the verification fails, the message is discarded, and the process ends. The second protocol layer constructs and sends a VARP response message, and the format of the message is in accordance with the structure of the VARP packet. The VARP response message includes the NLP address of the second party, the NLP address of the first party, the MAC address of the second party (as the source address), the MAC address of the first party (as the destination address), the serial number, and the second signature. The first protocol layer receives the VARP response message and uses the NLP address of the second party as a public key to verify the second signature. If the verification is successful, the first corresponding relationship of the second party is saved, that is, the corresponding relationship between the NLP address and the MAC address of the second party is saved. If the verification fails, the message is discarded, and the process ends. At this point, address resolution is complete.

When data is transmitted in a network layer using the TCP/IP protocol, an attacker can spoof the target host through the IP address, to carry out denial of service attack, forged TCP connection, session hijacking, hidden attack host address and the like on the target host. For an application scenario in which a receiving party only needs to receive data or information (one-sided communication), when an attacker masquerades as a sending party to send an attack data packet to the receiving party through IP spoofing, because the receiving party cannot verify the source identity of the received data packet, the receiving party is vulnerable to attack. Therefore, the present application further provides a method for source address authentication, to improve the security of network communication.

In an example, the present application provides a method and apparatus for source address authentication. Both communication parties (the sending party and the receiving party) in the present application use a New Link Protocol (NLP) stack, so that both communication parties can use the public key as the NLP address for network communication.

Figure 8C:
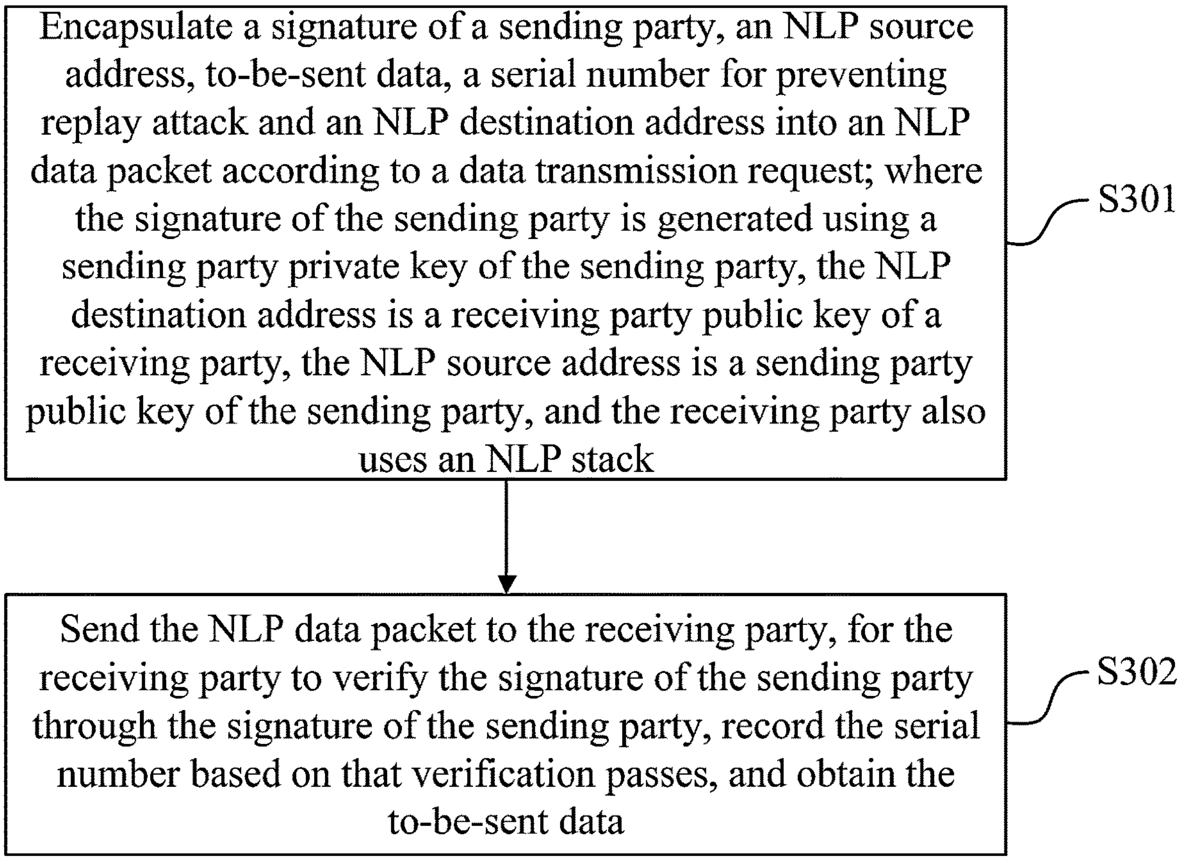
FIG. 8C is a schematic diagram of a modular structure of a communication apparatus (or device) according to an embodiment of the present application.

As shown in FIG. 8C, an embodiment of the present application provides a method for source address authentication, applied to a sending party. The sending party uses an NLP protocol stack, and the process of the method is as follows.

S301: a signature of a sending party, an NLP source address, to-be-sent data, a serial number for preventing replay attack and an NLP destination address are encapsulated into an NLP data packet according to a data transmission request; where the signature of the sending party is generated using a sending party private key of the sending party, the NLP destination address is a receiving party public key of a receiving party, the NLP source address is a sending party public key of the sending party, and the receiving party also uses an NLP stack.

S302: the NLP data packet is sent to the receiving party, for the receiving party to verify the signature of the sending party through the signature of the sending party, the serial number is recorded based on that verification passes, and the to-be-sent data is obtained.

In S301, the data transmission request may be generated based on an upper-layer application in the sending party, and the data transmission request may include the to-be-sent data and the NLP address of the receiving party.

The NLP extension header in the NLP data packet uses the NLPSig extension header, and the NLP data packet is encapsulated according to the encapsulation structure of the NLP data packet of FIG. 1.

In S301, before encapsulating a signature of a sending party, an NLP source address, to-be-sent data, a serial number for preventing replay attack and an NLP destination address to an NLP data packet, if the sending party has generated the NLP source address, S301 may be performed directly.

If the sending party does not generate the NLP source address, the NLP source address needs to be generated first, which is implemented in the following ways.

The sending party private key is generated randomly, and the sending party public key is generated based on an asymmetric encryption algorithm and the sending party private key.

The asymmetric encryption algorithm may be, for example, elliptic curve cryptography algorithm ED25519.

For example, the sending party is a server using the NLP protocol stack, when an application in the server needs to send a video stream of a movie to a receiving party (suppose a computer), the movie is divided into a plurality of pieces of to-be-sent data and sent to the receiving party in turn. When the server sends any one of the pieces of to-be-sent data, a corresponding data transmission request is generated, and the data transmission request includes the to-be-sent data and the NLP destination address of the receiving party.

However, because the server is a newly accessed server, the server has not set an NLP address. Therefore, it is necessary to randomly generate a 32-byte private key of the sending party. Then, the sending party public key is generated using the asymmetric encryption algorithm (such as elliptic curve cryptography algorithm ED25519) and the sending party private key. The sending party public key is used as the NLP address of the server. After that, the server encapsulates a signature of the sending party, an NLP source address, the to-be-sent data, a serial number for preventing replay attack, and an NLP destination address into an NLP data packet, and sends the NLP data packet to the computer.

In a possible embodiment, encapsulating the signature of the sending party, the NLP source address, the to-be-sent data, the serial number for preventing replay attack and the NLP destination address into the NLP data packet can be implemented in the following ways.

The NLP destination address and the to-be-sent data are obtained from the data transmission request; the NLP destination address is resolved to obtain a receiving party physical address of a receiving party; partial header information at least including a serial number and a random number in the NLP data packet are encrypted by using the sending party private key, to obtain the signature of the sending party; the signature of the sending party, the NLP source address, a sending party physical address of the sending party, the NLP destination address, the receiving party physical address, and the to-be-sent data are encapsulated into a data packet.

For example, a teacher conducts online video teaching through a device A (i.e., a sending party), a student watching the teaching video receives video content through a device B (i.e., a receiving party). The device A obtains the NLP destination address and the to-be-sent data of the device B from the data transmission request, and then resolves the NLP destination address, to obtain the physical address for the receiving party. At the same time, the device A encrypts partial header of the NLP data packet at least including the serial number and the random number using the sending party private key of the device A, to obtain the signature of the sending party corresponding to the NLP data packet and use the signature of the sending party as the digital signature in the NLP extension header. Finally, the signature of the sending party, the NLP source address, the sending party physical address of the sending party, the NLP destination address, the receiving party physical address, and the to-be sent data are encapsulated into an NLP data packet and sent to the device B, so that the device B can use the NLP source address to verify the signature of the sending party, and then verify the identity of the sending party. The serial number of the currently received NLP data packet is recorded after the verification is successful, to verify whether the next NLP data packet is repetitive and obtain the to-be-sent data.

It should be understood that after a plurality of pieces of to-be-sent data of the teaching video are generated in turn, correspondingly, a corresponding serial number is assigned to each pieces of to-be-sent data. Values of a plurality of serial numbers corresponding to a plurality of pieces of to-be-sent data are increased in time sequence. For example, the serial number corresponding to the first to-be-sent data is 1, the serial number of the second to-be-sent data is 2, . . . , and the serial number of the $n^{th}$ to-be-sent data is n.

In a possible implementation, a plurality of serial numbers in a plurality of data packets sent continuously from the sending party to the receiving party are set in an ascending order.

In a possible implementation, the serial number includes a time stamp, and the time stamp may be used as the serial number.

For example, generation time (that is, the time stamp) of the first to-be-sent data in the plurality of pieces of to-be-sent data of the above teaching video is 8:31, and the corresponding serial number may be set as 831. Generation time of the second to-be-transmitted data is 8:32, and the corresponding serial number may be set as 832. The rest may be deduced by analogy, which will not be repeated here.

After embodiments of the sending party side in the method for source address authentication are described, embodiments of the receiving party side in the method for source address authentication will be described.

Figure 8D:
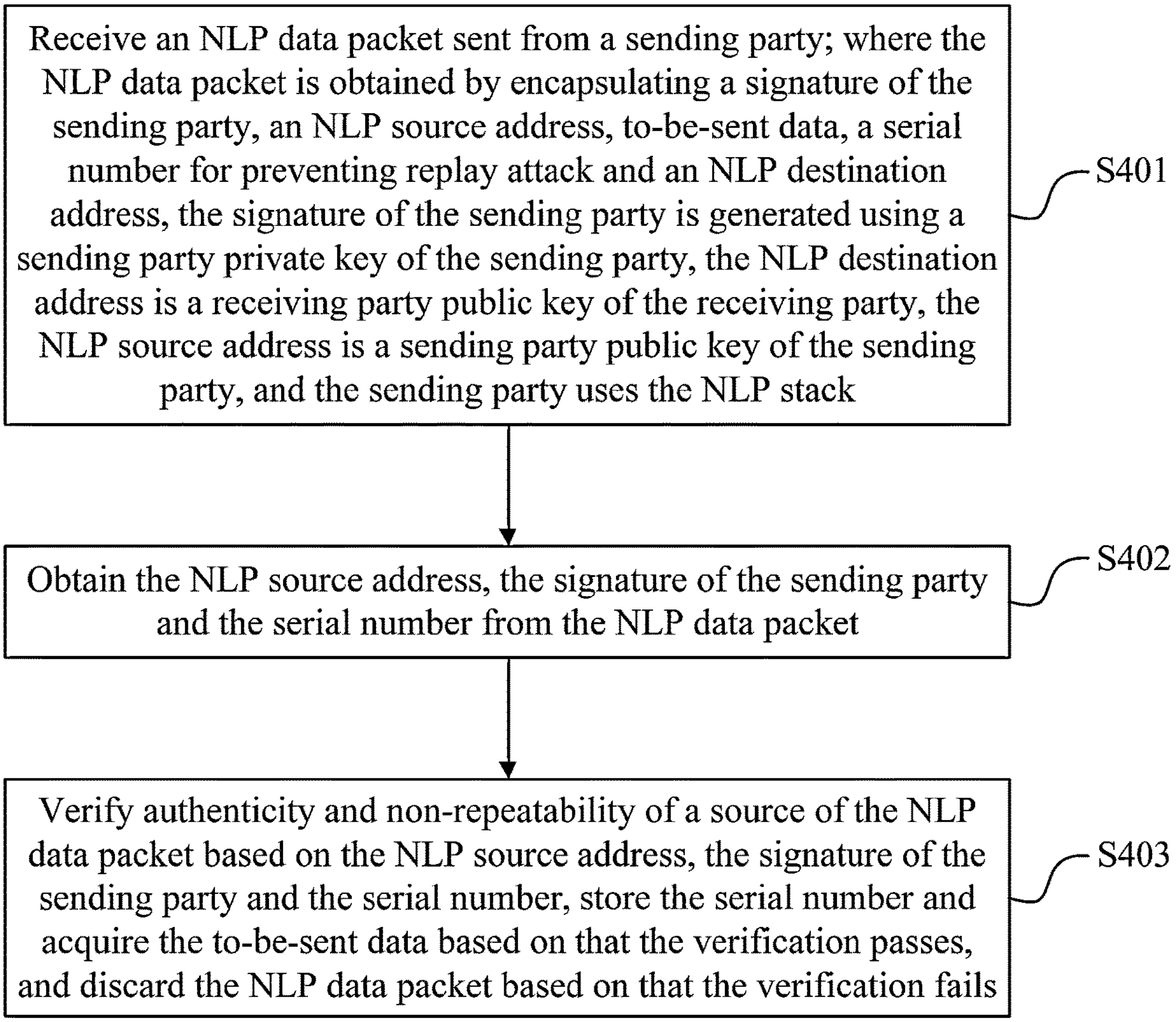
FIG. 8D is a schematic structural diagram of a communication apparatus (or device) in a communication method according to an embodiment of the present application.

Referring to FIG. 8D, an embodiment of the present application provides a method for source address authentication, applied to a receiving party. The receiving party uses a new link protocol (NLP) stack, and the method includes following steps.

S401: receiving an NLP data packet sent from a sending party; where the NLP data packet is obtained by encapsulating a signature of the sending party, an NLP source address, to-be-sent data, a serial number for preventing replay attack and an NLP destination address, the signature of the sending party is generated using a sending party private key of the sending party, the NLP destination address is a receiving party public key of the receiving party, the NLP source address is a sending party public key of the sending party, and the sending party uses the NLP stack.

S402: obtaining the NLP source address, the signature of the sending party and the serial number from the NLP data packet.

S403: verifying authenticity and non-repeatability of a source of the NLP data packet based on the NLP source address, the signature of the sending party and the serial number, storing the serial number and obtaining the to-be-sent data based on that the verification passes, and discarding the NLP data packet based on that the verification fails.

Verifying the authenticity and non-repeatability of the source of the NLP data packet based on the NLP source address, the signature of the sending party and the serial number can be implemented in following ways.

The signature of the sending party is verified by using the NLP source address, and it is determined that the source of the NLP data packet is the sending party if the verification is successful. It is determined whether the serial number for preventing replay attack is greater than a serial number in an NLP data packet previously received from the sending party. If the serial number is greater than the serial number in the NLP data packet previously received, the NLP data packet is determined to be not repetitive.

For example, the receiving party locally stores the serial number n of the NLP data packet previously sent from the sending party. The receiving party currently receives an NLP data packet 1 and an NLP data packet 2, obtains an NLP source address 1 and a signature 1 of the sending party from the NLP data packet 1, and verifies the signature 1 of the sending party by using the NLP address 1 of the sending party. The verification result is failure, the receiving party determines that the source of the NLP data packet 1 is doubtful, and the NLP data packet 1 is discarded if the verification fails.

The receiving party obtains the NLP source address 2 and the signature 2 of the sending party from the NLP data packet 2, verifies the signature 2 of the sending party using the NLP address 2 of the sending party. The verification result is passed, and it is determined that the source of the NLP data packet 2 is normal. And then it is further determined whether the serial number 2 carried in the NLP data packet 2 is greater than n (the serial number of the previous NLP data packet). If the serial number 2 carried in the NLP data packet 2 is greater than n, it is determined that the NLP data packet 2 is not repetitive. Then the to-be-sent data can be obtained from the NLP data packet 2, and be transmitted to an upper layer protocol for processing so as to be transmitted to an upper layer application. If the serial number 2 is less than or equal to n, it is determined that the NLP data packet 2 is invalid, and the NLP data packet 2 is discarded.

In order for those skilled in the art to fully understand the above technical solution, a detailed example is provided below.

Figure 8E:
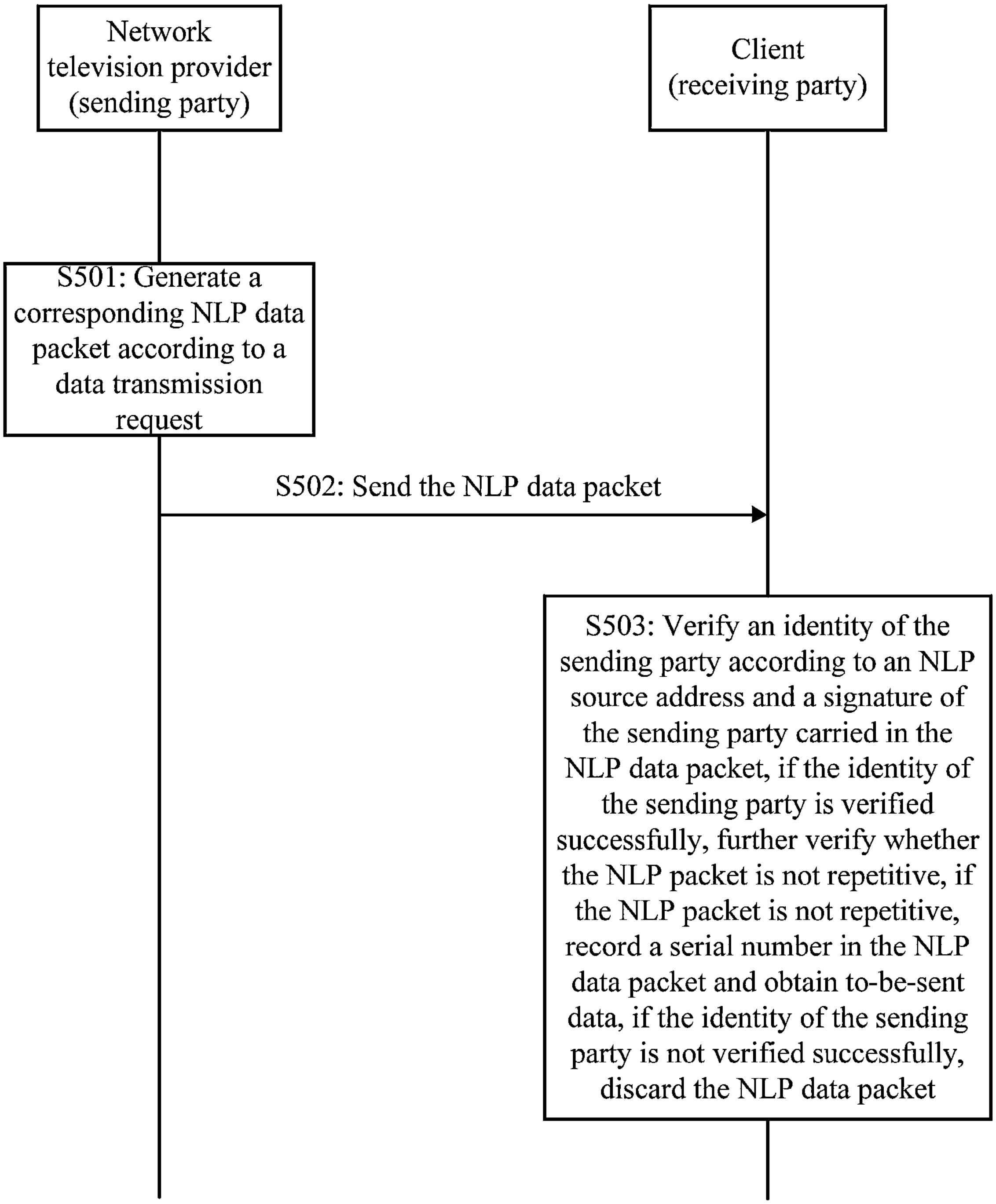
FIG. 8E is a schematic structural diagram of a communication apparatus (or device) in another communication method according to an embodiment of the present application.

FIG. 8E is a flowchart of a method for source address authentication according to an embodiment of the present application.

It is assumed that the sending party is a network television provider and the receiving party is a client. The network television provider divides a television program into a plurality of pieces of to-be-sent data and sends the data to the client. The network television provider generates a corresponding data transmission request for each piece of to-be-sent data, and the data transmission request includes an NLP destination address of the client and the to-be-sent data.

S501: the network television provider generates a corresponding NLP data packet according to the data transmission request.

The specific method for generating the NLP data packet can be referred to the description of embodiments in the sending party, and will not be described here.

S502: the network television provider sends the NLP data packet to the client.

S503: the client verifies an identity of the sending party according to an NLP source address and a signature of the sending party carried in the NLP data packet, if the identity of the sending party is verified successfully, further verifies whether the NLP data packet is not repetitive, if the NLP data packet is not repetitive, records a serial number in the NLP data packet and obtains to-be-sent data, if the identity of the sending party is not verified successfully, discards the NLP data packet.

In embodiments provided by the present application, an NLP source address and a signature of a sending party that can verify an identity of the sending party and a serial number for preventing replay attack are carried in an NLP data packet of the sending party, so that a receiving party can directly verify the NLP source address based on the received NLP data packet. The method for source address authentication has characteristics of decentralized self-authentication and other authentication, non-repudiation of the sending party, and preventing DDOS attacks. In addition, whether the NLP data packet is a data packet for replay attack is verified. When any verification fails, the NLP data packet is discarded, which can effectively resist replay attacks of directly copied packets while preventing IP address spoofing, improving the security of the receiving party. When being applied in unilateral communication with high timeliness requirements, the receiving party can have high timeliness and high network security simultaneously.

When data is transmitted in a network using the TCP/IP protocol, for a scenario in which both sides of communication need to interact, attacks on either side may cause the two sides to be unable to communicate normally. Therefore, the present application further provides a communication method for improving the security of network communication.

Figure 8F:
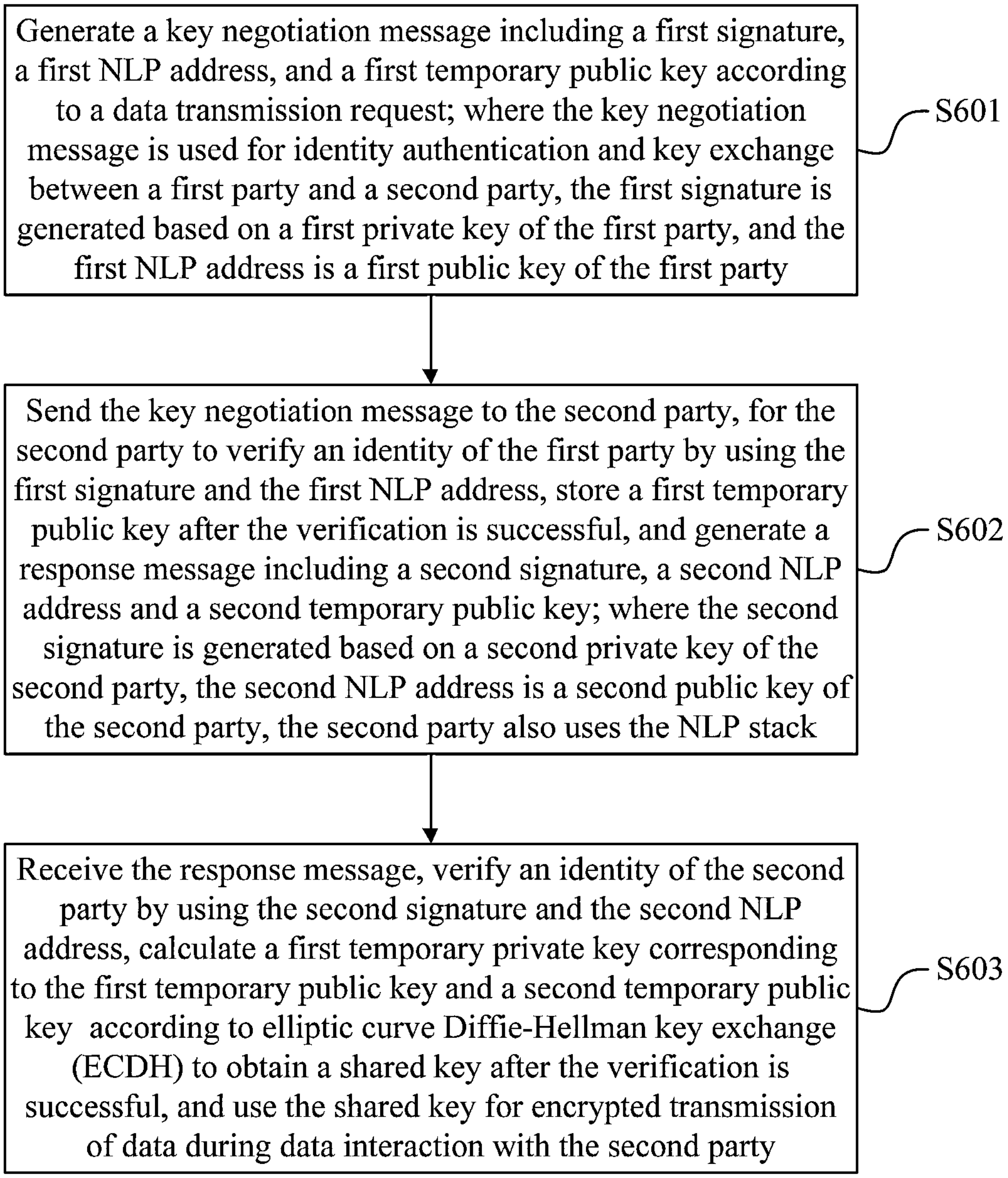
FIG. 8F is a schematic structural diagram of a communication apparatus (or device) in another communication method according to an embodiment of the present application.

For example, as shown in FIG. 8F, an embodiment of the present application provides a communication method, applied to a first party. The first party uses an NLP protocol stack, and the processing procedure of the communication method is as follows.

S601: a key negotiation message including a first signature, a first NLP address, and a first temporary public key is generated according to a data transmission request; where the key negotiation message is used for identity authentication and key exchange between a first party and a second party, the first signature is generated based on a first private key of the first party, and the first NLP address is a first public key of the first party.

In S601, the data transmission request may be generated based on an upper-layer application in the first party, and the data transmission request may include to-be-sent data, the first NLP address of the first party.

In embodiments of the present application, the first party may be a party that initiates a connection actively or a party that is connected passively. When the party that initiates the connection actively sends data to the party that is connected passively, the party that initiates the connection actively is the first party, and the party that is connected passively is the second party. When the party that is connected passively returns data to the party that initiates the connection actively, the party that is connected passively is the first party, and the party that initiates the connection actively is the second party.

If the first party has generated the first temporary public key, the first temporary public key can be used directly; if the first party has not generated the first temporary public key, before generating the key negotiation message including the first signature, the first NLP address and the first temporary public key, the first temporary public key also needs to be generated first, which can be implemented in following ways.

A first temporary key pair is generated according to the Elliptic Curve Diffie-Hellman key Exchange (ECDH). A public key in the first temporary key pair is used as the first temporary public key. A private key in the first temporary key pair is used as the first temporary private key.

In embodiments provided by the present application, a first temporary key pair is generated according to the ECDH, so that the first party and the second party can generate the same shared key based on the temporary public key of the other party and the temporary private key of the own party, to ensure that both communication parties use the same shared key to encrypt and transmit to-be-transmitted data based on the symmetric encryption algorithm, and both communication parties can use the shared key to decrypt the received encrypted data (and the encrypted to-be-transmitted data).

In embodiments provided by the present application, the key negotiation message is encapsulated by using a structure of a key negotiation data packet.

If the first party has generated the first NLP address, this step may be performed directly; if the first party has not generated the first NLP address, before generating the key negotiation message including the first signature, the first NLP address and the first temporary public key, the first NLP address also needs to be generated first, which is implemented in following ways.

The first private key is generated randomly, and the first public key is generated by using an asymmetric encryption algorithm and the first private key.

In a possible embodiment, generating the key negotiation message including the first signature, the first NLP address, and the first temporary public key, includes:

obtaining a second NLP address from the data transmission request; resolving the second NLP address to obtain a second physical address of the second party; encrypting partial header information at least including the first temporary public key and a time stamp in the key negotiation message by using the first private key, to obtain the first signature; where the time stamp is used for verifying timeliness of the key negotiation message; encapsulating the first signature, the first NLP address, the first physical address of the first party, the second NLP address, the second physical address, and the first temporary public key into the key negotiation message.

The partial header information includes an NLP basic header and an NLP extension header of the key negotiation message; or, a partial header in the NLP basic header and the NLP extension header. The NLP extension header is the NLPKey extension header.

For example, the first party sets the time stamp to 30 minutes after obtaining the second NLP address and the second physical address. The partial header information is an NLPKey extension header and a partial NLP basic header. The partial header information is calculated by using a first private key, to obtain a first signature; then, the first signature, the first NLP address, the first physical address of the first party, the second NLP address, the second physical address of the second party, and the first temporary public key are encapsulated according to a structure of a key negotiation data packet to obtain a key negotiation message. Valid time of the shared key generated by the key negotiation message is 30 minutes.

In embodiments provided by the present application, the shared key used by both communication parties in the communication process is negotiated by using the key negotiation message, so that by setting the valid time of the shared key generated by both communication parties in the key negotiation message, the shared key can be prevented from being illegally stolen, and the communication security of both communication parties can be improved. The first party and the second party may set an invalidation mechanism for the shared key by binding the temporary key pair generated by each party with the shared key and in combination with the set time stamp. When invalidation time corresponding to the time stamp is reached, both parties are forced to renegotiate and generate a new shared key for data transmission.

After the first party generates the key negotiation message, S602 may be performed.

S602: the key negotiation message is sent to the second party, for the second party to verify an identity of the first party by using the first signature and the first NLP address, store a first temporary public key after the verification is successful, and generate a response message including a second signature, a second NLP address and a second temporary public key; where the second signature is generated based on a second private key of the second party, the second NLP address is a second public key of the second party, the second party also uses the NLP stack.

After receiving the key negotiation message, the second party uses the first NLP address to verify the first signature, to verify the identity of the source address (i.e., the first NLP address), and after the verification fails, determine that the received key negotiation message is illegal. If the first signature is successfully verified by using the first NLP address, the first temporary public key is obtained and stored from the key negotiation message, and the first temporary public key and the second temporary private key generated by the second party are calculated according to the ECDH to obtain and store a shared key, for subsequent data transmission.

At the same time, the second temporary public key of the second party is also sent to the first party, to complete the key negotiation (that is, to generate the same shared key). The specific method is as follows.

The second signature, the second NLP address and the second temporary public key are encapsulated according to a key negotiation data packet, a response message corresponding to the key negotiation message is generated, and the response message is sent to the first party.

It should be noted that, the second party generates the second temporary key pair (including the second temporary public key and the second temporary private key) in the same way as the first party generates the first temporary key pair, which will not be described again.

After the second party sends the response message corresponding to the first party, step 603 may be performed.

S603: the response message is received, an identity of the second party is verified by using the second signature and the second NLP address, a first temporary private key corresponding to the first temporary public key and a second temporary public key are calculated according to the elliptic curve Diffie-Hellman key exchange (ECDH) to obtain a shared key after the verification is successful, and the shared key for encrypted transmission of data is used during data interaction with the second party.

After receiving the response message, the second party needs to verify the second signature using the second NLP address carried in the response message, to verify the identity of the second party, which is implemented in the following ways.

The second signature is verified by using the second NLP address. If the verification is successful, it is determined that the identity of the second party is verified successfully. If the second signature fails to be verified by using the second NLP address, it is determined that the verification of the identity of the second party fails, and the response message is discarded.

A second temporary public key is obtained from the response message after the identity of the second party is verified successfully by using the second NLP address, to complete the key exchange between the first party and the second party. At the same time, the first temporary private key and the second temporary public key are calculated according to the ECDH to obtain and store a shared key, to complete key negotiation between the first party and the second party. Then the first party and the second party can encrypt and transmit the data by using the shared key negotiated by the two parties.

It should be understood that since the shared keys generated by the first party and the second party are the same, in embodiments provided by the present application, there is no strict distinction between the shared key generated by the first party and the shared key generated by the second party.

In embodiments provided by the present application, after the first party and the second party complete the key negotiation, the shared key obtained through negotiation can be configured to data interaction, which is implemented in following ways.

To-be-transmitted data is obtained from the data transmission request when sending the to-be-transmitted data to the second party. The to-be-transmitted data is encrypted by using a symmetric encryption algorithm with a characteristic of Authenticated Encryption with Associated Data (AEAD) and the shared key, to obtain encrypted to-be-transmitted data. The to-be-transmitted data is multilayer data above a network layer in the NLP stack of the first party.

The encrypted to-be-transmitted data is encapsulated into a first NLPSec message and the first NLPSec message is sent to the second party.

After receiving a second NLPSec message sent from the second party, the encrypted data in the second NLPSec message is decrypted and checked for the integrity thereof using the symmetric encryption algorithm and the shared key. After the check is successful, the decrypted data is transmitted to a transport layer in the NLP stack of the first party for processing.

For example, a first party (a computer 1 used by a user 1) sends an email to a second party (a computer 2 used by a user 2). The computer 1 (first party) completes the key exchange with the computer 2 (second party) through the key negotiation message. After generating the same shared key, the computer 1 can send content of the mail to the computer 2 by using the generated shared key.

The computer 1 obtains the content of the mail from the data transmission request, and encrypts multilayer data (in which the content of the mail is included) above the network layer in the local NLP protocol stack by using a symmetric encryption algorithm (such as chacha20-poly1305 algorithm) with the characteristic of AEAD and a shared key, to obtain encrypted to-be-transmitted data. The to-be-transmitted data is encapsulated according to an NLPSec data packet to generate a first NLPSec message, and the first NLPSec message is sent to the computer 2.

After receiving the first NLPSec message, the computer 2 verifies a digital signature carried in the message through the first NLP address. After the verification is successful, encrypted to-be-transmitted data is obtained from the first NLPSec message, the encrypted to-be-transmitted data is decrypted with a local shared key, to obtain the to-be-transmitted data, and the content of the mail is obtained from the to-be-transmitted data. In addition, the computer 2 sends a response message (i.e., a second NLPSec message) indicating that the content of the mail has been successfully received to the computer 1. The response message is encapsulated according to an NLPSec data packet.

After the computer 1 receives the second NLPSec message (the response message of the content of the mail), and after the digital signature carried in the second NLPSec message is successfully verified by using the second NLP address carried in the second NLPSec message, confirmation information carried in the second NLPSec message for confirming that the computer 2 successfully receives the content of the mail is obtained. Thus, the bilateral interaction process between the computer 1 and the computer 2 is completed.

In embodiments provided by the present application, during data transmission, the to-be-transmitted data is encrypted by using a symmetric encryption algorithm with the characteristic of AEAD and a shared key negotiated by both parties, the confidentiality of the to-be-transmitted data and the integrity of the NLPSec data packet can be simultaneously guaranteed. At the same time, security authentication is decoupled from the upper application.

Figure 8G:
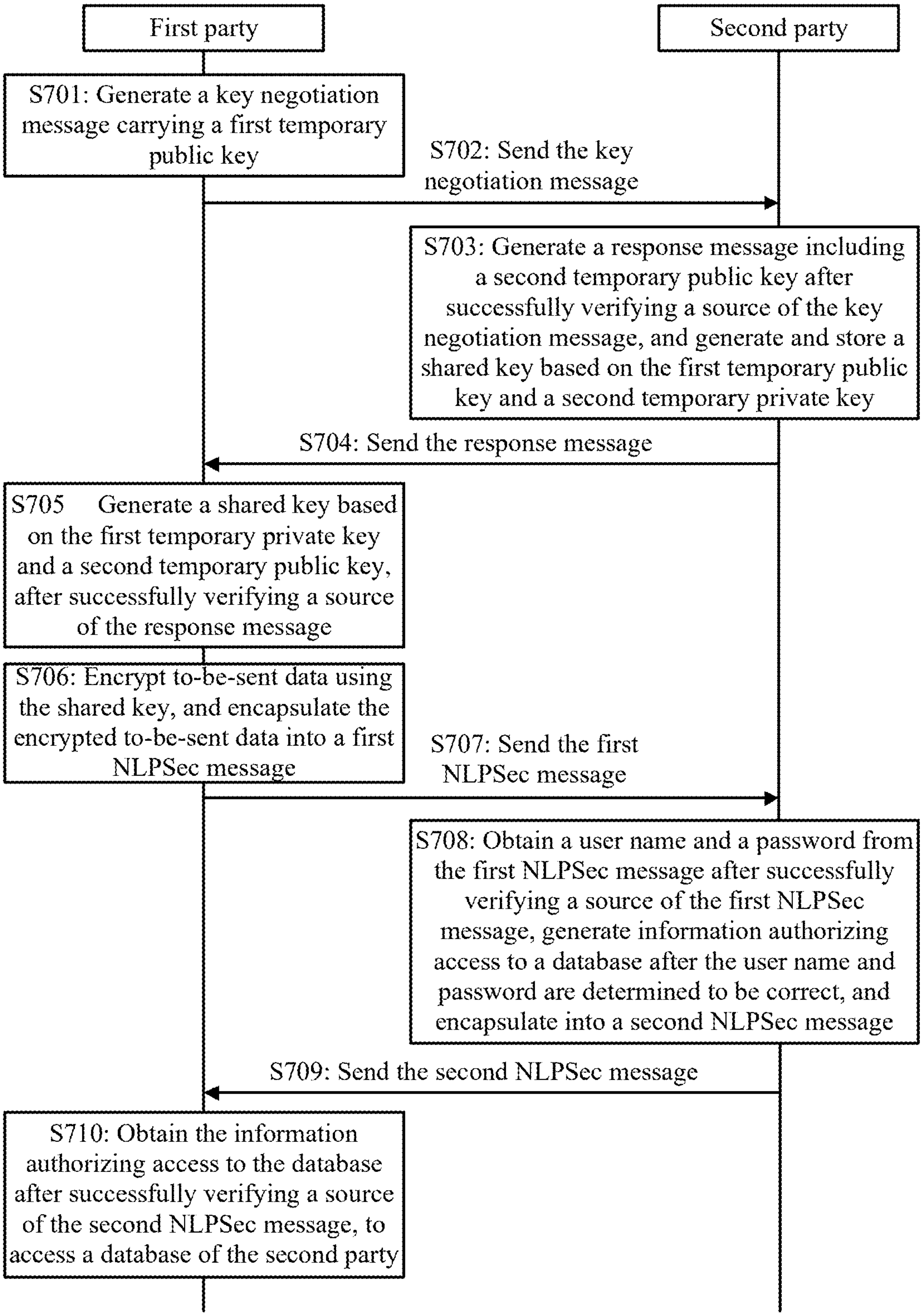
FIG. 8G is a schematic structural diagram of a communication apparatus (or device) in another communication method according to an embodiment of the present application.

FIG. 8G is a flowchart of interaction between a first party and a second party according to an embodiment of the present application.

S701: the first party generates a key negotiation message carrying a first temporary public key.

The first party needs to remotely log into a database of the second party, then an upper layer application of the second party generates a user name and a password required for logging in the database and a second NLP address the second party included in a data transmission request. A key negotiation message including a first signature, a first NLP address, and the first temporary public key is generated.

S702: the first party sends the key negotiation message to the second party.

S703: the second party generates a response message including a second temporary public key after successfully verifying a source of the key negotiation message, and generates and stores a shared key based on the first temporary public key and a second temporary private key.

The second party verifies the source of the key negotiation message, that is, verifies the first signature using the first NLP address carried in the key negotiation message.

S704: the second party sends the response message corresponding to the first party.

S705: after the first party successfully verifies the source of the response message, the first party generates a shared key based on a first temporary private key and the second temporary public key.

At this point, the first party and the second party both obtain the temporary public key of the other party, complete the key exchange, and generate the same shared key.

S706: the first party encrypts to-be-transmitted data using the shared key, and encapsulates the encrypted to-be-transmitted data into a first NLPSec message.

The to-be-transmitted data includes the user name and password required for logging in the database. The first party encrypts the to-be-transmitted data using a symmetric encryption algorithm with the characteristic of AEAD and a shared key.

S707: the first party sends the first NLPSec message to the second party.

S708: the second party obtains a user name and a password from the first NLPSec message after successfully verifying a source of the first NLPSec message, generates information authorizing access to a database after the user name and password are determined to be correct, and encapsulates the information into a second NLPSec message.

S709: the second party sends the second NLPSec message to the first party.

S710, the first party obtains the information authorizing access to the database after successfully verifying a source of the second NLPSec message, to access a database of the second party.

Figure 9A:
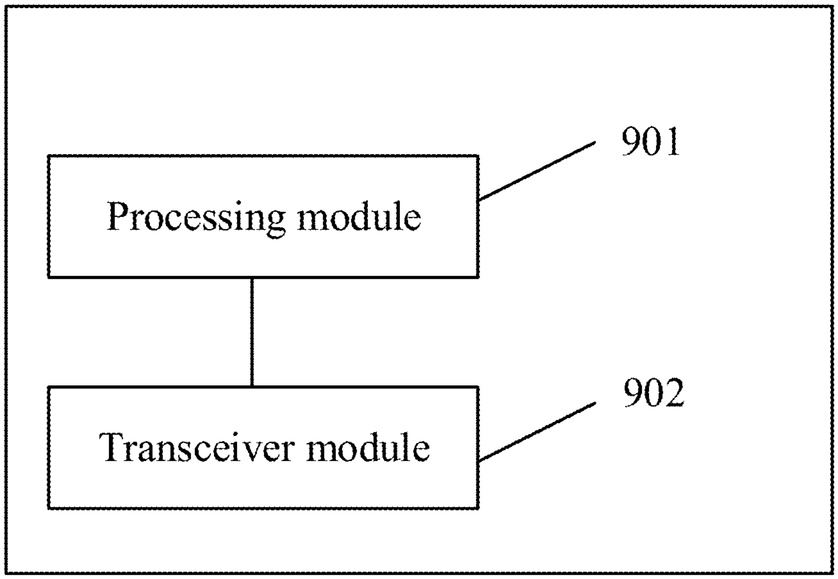
FIG. 9A is a schematic diagram of a modular structure of another communication apparatus (or device) according to an embodiment of the present application.

FIG. 9A is a schematic diagram of a modular structure of a communication apparatus (or device) according to an embodiment of the present application. A processing module 901 may be configured to perform processing actions, and a transceiver module 902 may be configured to implement communication actions. For example, when the first party described in the above method embodiment is implemented by this structure, the processing module 901 may be configured to perform S101, S102, S106, and/or S107, and the transceiver module 902 may be configured to perform S104 and/or S108. When the second party described in the above method embodiment is implemented by this structure, the transceiver module 902 may be configured to perform S104, and the processing module 901 may be configured to perform S103, S105 and/or S109. The specific executed actions and functions are not expanded here, and reference can be made to the description of the foregoing method embodiments.

For example, when the first party shown in FIG. 8A is realized by the structure shown in FIG. 9A, the processing module 901 may be configured to implement processing actions implemented by the first protocol layer of the first party. For example, the processing module 901 may be configured to obtain an MAC address of a second party and generate a first temporary key pair. The transceiver module 902 may be configured to implement communication actions implemented by the first party. For example, the transceiver module 902 may be configured for the first party to send information, data or signals to a second party, or to receive information, data or signals from the second party, such as to send the first temporary public key in the aforementioned first temporary key pair.

For example, the processing module 901 may include an MAC address obtaining module, a key generating module, and a determining module. Wen implementing the processing actions implemented by the first protocol layer of the first party, the MAC address obtaining module may be configured for the first protocol layer of the first party to obtain the MAC address of the second party according to the data transmission request from the application layer. The key generation module can be configured to obtain a second temporary public key of the second party according to the first temporary public key, and generate a shared key according to the second temporary public key and the first temporary private key. The determination module may be configured to determine a data message, and the data message carries the MAC address of the second party and encrypted data obtained by encrypting using the shared key.

The processing module 901 may be further configured to generate a shared key.

The processing module 901 may further determine the data packet according to the to-be-sent data and the shared key.

Similarly, when the second party shown in FIG. 8A is realized by the structure shown in FIG. 9A, the processing module 901 may be configured to implement the processing actions implemented by the second protocol layer of the second party. For example, the processing module 901 may be configured to generate a second temporary key pair. The transceiver module 902 may be configured to implement communication actions implemented by the second party. For example, the transceiver module 902 may be configured for the second party to transmit information, data, or signals to the first party, or to receive information, data, or signals from the first party, such as to send a message for carrying the second temporary public key.

For example, the processing module 901 may include an obtaining module, a key generation module, a message generation module, and a decryption module. When implementing the processing actions implemented by the second protocol layer of the second party, the obtaining module may be configured to obtain the first temporary public key of the first party. The key generation module may be configured to generate a second temporary key pair, and generate a shared key according to the first temporary public key and the second temporary private key. The message generation module may be configured to generate a message carrying the second temporary public key. The decryption module can be configured to decrypt the encrypted data carried in the data message according to the shared key.

The processing module 901 may be further configured to generate a shared key.

The processing module 901 may also obtain a data packet from the first party.

The data packet may be received by the transceiver module 902.

The concepts and definitions of the implementations of the above device embodiments can be found in the description of the method embodiments.

For example, when the first party shown in FIG. 8B is implemented by the structure shown in FIG. 9A, the processing module 901 may be configured to perform processing actions, and the transceiver module 902 may be configured to implement communication actions. For example, when the first party described in the above method embodiment is implemented by this structure, the transceiver module 902 may be configured to perform the action of S201 of sending an address resolution request message to the second party and/or perform the action of S203 of receiving an address resolution request message from the second party. The processing module 901 may be configured to perform S204. For example, at this time, the transceiver module 902 may include a message sending module and a message receiving module. The message sending module can be configured to send an address resolution request message. The message receiving module may be configured to receive a first response message from the second party. The processing module 901 may include a storage module configured to store a corresponding relationship between the NLP address of the second party and the MAC address of the second party after determining that the second signature is verified according to the NLP address of the second party.

For example, when the second party shown in FIG. 8B described in the above method embodiment is realized by this structure, the transceiver module 902 can be configured to perform the action of receiving an address resolution request message from a first party in S201, and the processing module 901 can be configured to perform the action of verifying the first signature in S203. The transceiver module 902 may further be configured to perform the action of sending the first response message corresponding to the first party in S203. The specific executed actions and functions are not expanded here, and reference can be made to the description of the foregoing method embodiments. For example, at this time, the transceiver module 902 may include a message sending module and a message receiving module. The message receiving module can be configured to receive an address resolution request message from a first party. The message sending module can be configured to determine whether the first signature passes the verification according to the NLP address of the first party, and send a first response message corresponding to the first party.

Figure 9B:
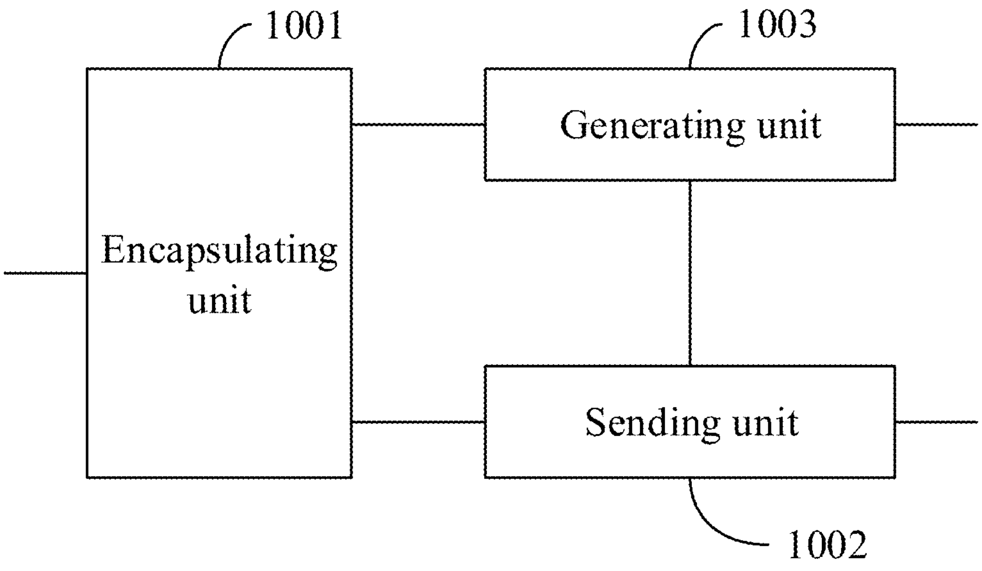
FIG. 9B is a schematic diagram of a modular structure of another communication apparatus (or device) according to an embodiment of the present application.

For example, as shown in FIG. 9B, based on the same inventive concept, an embodiment of the present application provides an apparatus for source address authentication applied to the sending party in FIG. 8E. Embodiments of the method for source address authentication of the apparatus can be referred to the description of embodiments of the method at the sending party side. The repetition is not repeated, and the apparatus includes:

an encapsulating unit 1001, configured to encapsulate a signature of the sending party, an NLP source address, to-be-sent data, a serial number for preventing replay attack and an NLP destination address into an NLP data packet; where the signature of the sending party is generated using a sending party private key of the sending party, the NLP destination address is a receiving party public key of a receiving party, the NLP source address is a sending party public key of the sending party, and the receiving party also uses a new link protocol (NLP) stack;

a sending unit 1002, configured to send the NLP data packet to the receiving party, for the receiving party to verify the signature of the sending party using the signature of the sending party, record the serial number based on that the verification is passed, and obtain the to-be-sent data.

In a possible embodiment, the apparatus further includes a generating unit 1003 configured to: generate the sending party private key randomly; generate the sending party public key based on an asymmetric encryption algorithm and the sending party private key.

In a possible embodiment, the encapsulating unit 1001 is further configured to obtain the NLP destination address and the to-be-sent data from the data transmission request; resolve the NLP destination address to obtain a receiving party physical address of the receiving party; encrypt partial header information at least including the serial number and a random number in the NLP data packet by using the sending party private key, to obtain the signature of the sending party; encapsulate the signature of the sending party, the NLP source address, the sending party physical address of the sending party, the NLP destination address, the receiving party physical address and the to-be-sent data into the NLP data packet.

In a possible embodiment, a plurality of serial numbers in a plurality of data packets continuously sent from the sending party to the receiving party are set in an ascending order.

In a possible implementation, the serial number includes a time stamp.

Figure 9C:
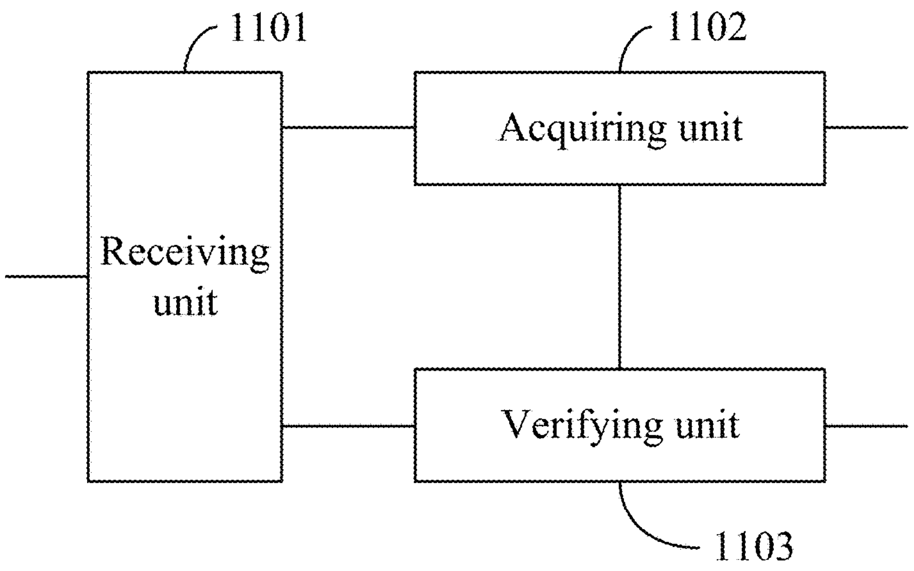
FIG. 9C is a schematic diagram of a modular structure of another communication apparatus (or device) according to an embodiment of the present application.

Based on the same inventive concept, an embodiment of the present application provides an apparatus for source address authentication applied to a receiving party. Embodiments of the method for source address authentication of the apparatus can be referred to the description of embodiments of the method at the sending party side, and the repetition is not repeated. Referring to FIG. 9C, the apparatus includes:

a receiving unit 1101, configured to receive an NLP data packet sent from a sending party; where the NLP data packet is obtained by encapsulating a signature of the sending party, an NLP source address, to-be-sent data, a serial number for preventing replay attack and an NLP destination address, the signature of the sending party is generated using a sending party private key of the sending party, the NLP destination address is a receiving party public key of the receiving party, the NLP source address is a sending party public key of the sending party, and the sending party also uses a new link protocol (NLP) stack;

an obtaining unit 1102, configured to obtain the NLP source address, the signature of the sending party and the serial number from the NLP data packet;

a verifying unit 1103, configured to verify authenticity and non-repeatability of a source of the NLP data packet based on the NLP source address, the signature of the sending party and the serial number, store the serial number and obtain the to-be-sent data based on that the verification passes, and discard the NLP data packet based on that the verification fails.

In a possible embodiment, the verifying unit 1103 is further configured to verify the signature of the sending party using the NLP source address, determine that a source of the NLP data packet is the sending party based on that the verification is successful; determine whether the serial number for preventing replay attack is greater than a serial number in an NLP data packet previously received from the sending party, determine that the NLP data packet is not repetitive based on that the serial number for preventing replay attack is greater than the serial number in the NLP data packet previously received.

Figure 10:
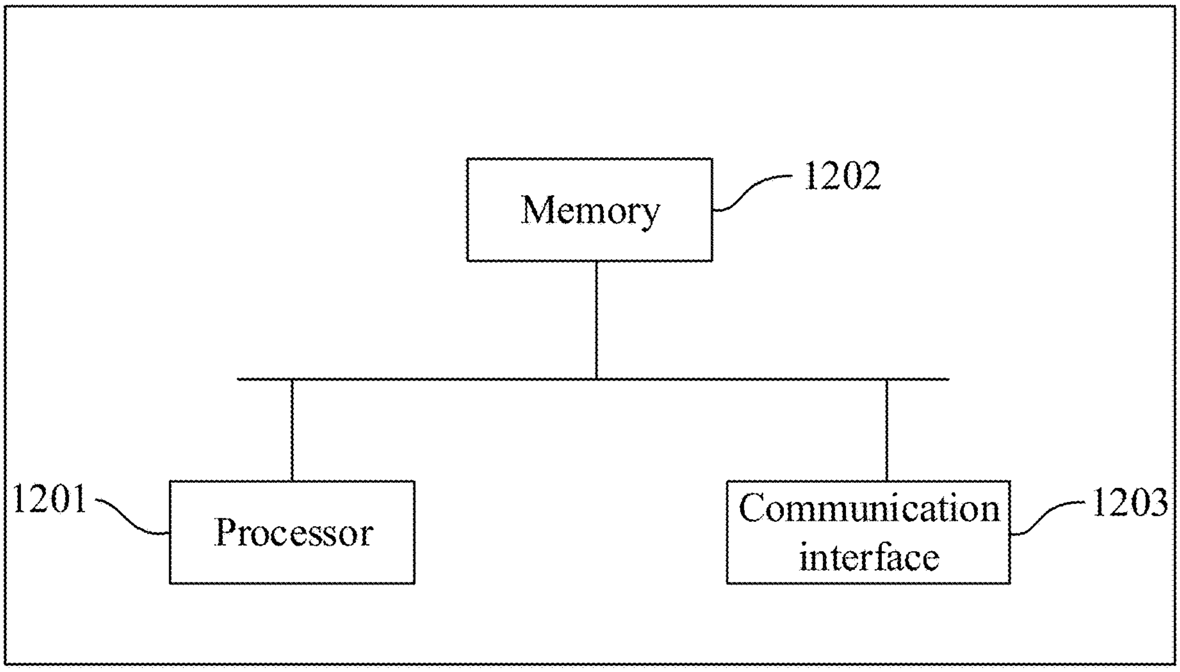
FIG. 10 is a schematic structural diagram of a communication apparatus (or device) in another communication method according to an embodiment of the present application.

FIG. 10 is a schematic structural diagram of a communication apparatus (or device) in a communication method according to an embodiment of the present application.

An electronic device in embodiments of the present application may include a processor 1201. The processor 1201 is a control center of the device, may be connected to various parts of the device using various interfaces and lines, and may run or execute instructions stored in a memory 1202 and calling up data stored in the memory 1202. Optionally, the processor 1201 may include one or more processing units, and the processor 1201 may integrate an application processor and a modem processor. The application processor mainly deals with operating systems and applications, and the modem processor mainly deals with wireless communications. It should be understood that the modem processor may not be integrated into the processor 1201. In some embodiments, the processor 1201 and the memory 1202 may be implemented on the same chip. In some embodiments, the processor 1201 and the memory 1202 may also be implemented separately on separate chips.

The processor 1201 may be a general-purpose processor, such as a central processing unit (CPU), a digital signal processor, a dedicated integrated circuit, a field programmable gate array or other programmable logic devices, a discrete gate or a transistor logic device, a discrete hardware component, which can implement or execute the methods, steps, and logic blocks disclosed in embodiments of the present application. The general-purpose processor may be a microprocessor or any conventional processor or the like. The steps performed by the electronic device disclosed in connection with embodiments of the present application may be performed directly by a hardware processor, or by a combination of hardware and software modules in a processor.

In an embodiment of the present application, the memory 1202 stores instructions that are executable by at least one processor 1201. The at least one processor 1201 may be configured to perform the aforementioned communication processes performed by the first party (or the first protocol layer) and/or the second party (or the second protocol layer) by executing the instructions stored in the memory 1202.

The memory 1202 as a non-transitory computer-readable storage medium may be configured to store non-transitory software programs, non-transitory computer-executable programs, and modules. Memory 1202 may include at least one type of storage medium, such as a flash memory, a hard disk, a multimedia card, a card-type memory, a Random Access Memory (RAM), a Static Random Access Memory (SRAM), a Programmable Read Only Memory (PROM), a Read Only Memory (ROM), an Electrically Erasable Programmable Read Only Memory (EEPROM), a magnetic memory, a magnetic disk, an optical disk, and the like. The memory 1202 is any other medium capable of being configured to carry or store desired program codes in the form of instructions or data structures and is accessible by a computer, but is not limited thereto. The memory 1202 in embodiments of the present application may also be a circuit or any other device capable of implementing a memory function, for storing program instructions and/or data.

In the embodiment of the present application, the device may further include a communication interface 1203 through which the electronic device may transmit data. For example, if the electronic device is a first party, the communication interface 1203 may be configured to send a message to a second party.

Optionally, the processing module 901 shown in FIG. 9A may be implemented by the processor 1201 (or the processor 1201 and the memory 1202) shown in FIG. 10, and/or, the transceiver module 902 shown in FIG. 9A is implemented by the communication interface 1203.

Figure 11:
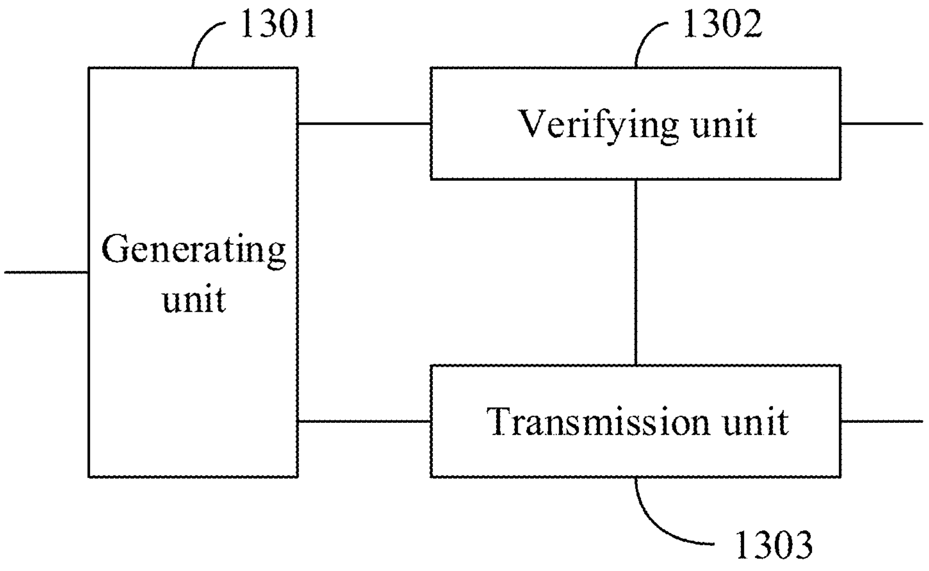
FIG. 11 is a schematic diagram of a modular structure of another communication apparatus (or device) according to an embodiment of the present application.

Based on the same inventive concept, an embodiment of the present application further provides a communication apparatus. Embodiments of the communication method of the communication apparatus can be referred to the description of embodiments of the method, and the repetition is not repeated. Referring to FIG. 11, the communication apparatus includes a generating unit 1301, configured to generate a key negotiation message including a first signature, a first NLP address and a first temporary public key according to a data transmission request; where the key negotiation message is used for identity authentication and key exchange between the first party and the second party, the first signature is generated based on a first private key of the first party, and the first NLP address is a first public key of the first party; a verifying unit 1302, configured to send the key negotiation message to the second party, for the second party to verify an identity of the first party by using the first signature and the first NLP address, store a first temporary public key after the verification is successful, and generate a response message including a second signature, a second NLP address and a second temporary public key; where the second signature is generated based on a second private key of the second party, the second NLP address is a second public key of the second party, the second party also uses the NLP stack; a transmission unit 1303, configured to receive the response message, verify an identity of the second party by using the second signature and the second NLP address, calculate a first temporary private key corresponding to the first temporary public key and a second temporary public key according to elliptic curve Diffie-Hellman key exchange (ECDH) to obtain a shared key after the verification is successful, and use the shared key for encrypted transmission of data during data interaction with the second party.

In a possible embodiment, the generating unit 1301 is further configured to generate a first temporary key pair according to the ECDH; use the public key in the first temporary key pair as the first temporary public key; use the private key in the first temporary key pair as the first temporary private key.

In a possible embodiment, the generating unit 1301 is further configured to randomly generate the first private key; generate the first public key by using an asymmetric encryption algorithm and the first private key.

In a possible embodiment, the generating unit 1301 is further configured to obtain the second NLP address from the data transmission request; resolve the second NLP address to obtain a second physical address of the second party; encrypt partial header information at least including the first temporary public key and a time stamp in the key negotiation message by using the first private key to obtain the first signature; where the time stamp is used for verifying timeliness of the key negotiation message; encapsulate the first signature, the first NLP address, the first physical address of the first party, the second NLP address, the second physical address and the first temporary public key into the key negotiation message.

In a possible implementation, the partial header information includes an NLP basic header and an NLP extension header of the key negotiation message; or, a partial header in the NLP basic header and the NLP extension header.

In a possible embodiment, the verifying unit 1302 is further configured to verify the second signature using the second NLP address; determine that the identity of the second party is verified successfully if the authentication is successful; determine that the verification of the identity of the second party fails, and discard the response message if the second signature fails to be verified by using the second NLP address.

In a possible embodiment, the transmission unit 1303 is configured to obtain to-be-transmitted data from the data transmission request when sending the to-be-transmitted data to the second party; encrypt the to-be-transmitted data by using a symmetric encryption algorithm with a characteristic of Authenticated Encryption with Associated Data (AEAD) and the shared key, to obtain encrypted to-be-transmitted data; where the to-be-transmitted data is multi-layer data above the network layer in the NLP protocol stack of the first party; encapsulate the encrypted to-be-transmitted data into a first NLPSec message and send the first NLPSec message to the second party; decrypt and check integrity of encrypted data in a second NLPSec message using the symmetric encryption algorithm and the shared key, after receiving the second NLPSec message sent from the second party, and transmit the decrypted data to the transport layer in the NLP protocol stack of the first party for processing after the verification is successful.

Based on the same inventive concept, an embodiment of the present application further provides a computer-readable storage medium storing instructions thereon. The instructions, when executed on a computer, cause the computer to perform operations and steps according to embodiments of the method described above with reference to FIG. 9A. The computer-readable storage medium may be the memory 1202 shown in FIG. 10.

Based on the same inventive concept, an embodiment of the present application further provides an electronic device for source address authentication. When the electronic device is in operation, the electronic device is capable of performing operations and steps according to embodiments of the method described above with reference to FIGS. 9B and 9C. The electronic device includes at least one processor and a memory connected with the at least one processor.

The memory stores instructions executable by the at least one processor. The at least one processor performs the method for source address authentication at the sending party side or the receiving party side as described above by executing instructions stored in the memory.

Based on the same inventive concept, an embodiment of the present application further provides a computer-readable storage medium, including:

- a memory for storing instructions that, when executed by a processor, causing an apparatus including the computer-readable storage medium to accomplish the method for source address authentication at the sending party side or the receiving party side as described above.

Those skilled in the art should understand that embodiments of the present application can be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, a CD0ROM, an optical memory and the like) containing computer available program codes.

The present application is described with reference to flow charts and/or block diagrams of the methods, the devices (systems), and the computer program products according to embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing device, generating a machine, such that the instructions, when executed by the processor of the computers or other programmable data processing device, generate apparatuses for implementing functions specified in one or more flows in the flow charts and/or one or more blocks in the block diagrams.

The computer program instructions may also be stored in a computer readable memory which can guide the computers or other programmable data processing devices to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing devices, so that a series of operating steps may be executed on the computers or other programmable devices to generate computer-implemented processing, such that the instructions executed on the computers or other programmable devices provide steps for implementing the functions specified in one or more flows in the flow charts and/or one or more blocks in the block diagrams.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. An encrypted communication method, applied to a first party, wherein the first party uses a new link protocol, NLP, stack, and the method comprises:

- obtaining, by a first protocol layer of the first party, an MAC address of a second party according to a data transmission request from an application layer, wherein the data transmission request comprises an NLP address of the second party;
- generating, by the first protocol layer, a first temporary key pair, wherein the first temporary key pair comprises a first temporary public key and a first temporary private key;
- obtaining, by the first protocol layer, a second temporary public key of the second party according to the first temporary public key;

generating, by the first protocol layer, a shared key according to the second temporary public key and the first temporary private key; and determining, by the first protocol layer, a data message, wherein the data message carries the MAC address of the second party and encrypted data obtained by encrypting using the shared key, and a receiving party of the data message is the second party;

wherein the obtaining, by the first protocol layer of the first party, the MAC address of the second party according to the data transmission request from the application layer, comprises:

generating, by the first protocol layer, an address resolution request message, wherein a source address of the address resolution request message is an NLP address of the first party, a destination address of the address resolution request message is the NLP address of the second party, the address resolution request message comprises the MAC address of the first party and a first signature, the first signature is generated based on a first private key of the first party, and the NLP address of the first party is a public key corresponding to the first private key;

obtaining, by the first protocol layer, a first response message from the second party, wherein the first response message is a response message corresponding to the address resolution request message, a source address of the first response message is the NLP address of the second party, a destination address of the response message is the NLP address of the first party, the response message comprises the MAC address of the second party and a second signature, the second signature is generated based on a second private key of the second party, and the NLP address of the second party is a public key corresponding to the second private key;

obtaining, by the first protocol layer, the MAC address of the second party, after the first protocol layer determines that the second signature has been verified according to the NLP address of the second party.

2. The method according to claim 1, wherein the obtaining, by the first protocol layer of the first party, the MAC address of the second party according to the data transmission request from the application layer, the data transmission request comprising the NLP address of the second party, comprises:

determining, by the first protocol layer, the MAC address of the second party according to the NLP address of the second party and a first corresponding relationship, the first corresponding relationship comprising a corresponding relationship between the NLP address of the second party and the MAC address of the second party.

3. The method according to claim 1, wherein the obtaining, by the first protocol layer, the second temporary public key of the second party according to the first temporary public key, comprises:

generating, by the first protocol layer, a key negotiation request message, wherein the key negotiation request message comprises a third signature and the first temporary public key, a source address of the key negotiation request message is an NLP address of the first party, a destination address of the key negotiation request message is the NLP address of the second party, the third signature is generated based on a first private key of the first party, and the NLP address of the first party is a public key corresponding to the first private key;

obtaining, by the first protocol layer, a second response message, wherein the second response message is a response message corresponding to the key negotiation request message, the second response message comprises a fourth signature and the second temporary public key, a source address of the second response message is the NLP address of the second party, a destination address of the second response message is the NLP address of the first party, the fourth signature is generated based on a second private key of the second party, and the NLP address of the second party is a public key corresponding to the second private key;

determining, by the first protocol layer, the shared key according to the first temporary private key and the second temporary public key, after the first protocol layer determines that the fourth signature has been verified according to the NLP address of the second party.

4. The method according to claim 3, further comprising:

generating, by the first party, the first private key randomly;

generating, by the first party, the public key corresponding to the first private key through elliptic curve cryptography according to the first private key;

using, by the first party, the public key corresponding to the first private key as the NLP address of the first party.

5. The method according to claim 1, wherein the address resolution request message is an extended Address Resolution Protocol, ARP, message, and the method further comprises:

encrypting, by the first party, to-be-signed content in the address resolution request message according to the first private key, to obtain the first signature.

6. The method according to claim 5, wherein the to-be-signed content comprises a time stamp, and the time stamp is used for verifying timeliness of the address resolution request message.

7. The method according to claim 1, wherein before the first party sends the address resolution request message to the second party, the method further comprises:

determining, by the first party, that the MAC address of the second party is not stored in a neighbor list, wherein the neighbor list is used for storing a corresponding relationship between an NLP address and an MAC address of a communication device communicating with the first party.

8. An encrypted communication method, applied to a second party, wherein the second party uses a new link protocol, NLP, stack, and the method comprises:

obtaining, by a second protocol layer of the second party, a first temporary public key of a first party;

generating, by the second protocol layer, a second temporary key pair, wherein the second temporary key pair comprises a second temporary public key and a second temporary private key;

generating, by the second protocol layer, a shared key according to the first temporary public key and the second temporary private key;

generating, by the second protocol layer, a message carrying the second temporary public key, wherein a receiving party of the message is the first party, and the second temporary public key is used for the first party to generate the shared key; and decrypting, by the first protocol layer, encrypted data carried in a data message according to the shared key, wherein a sending party of the data message is the first party, and the data message further carries an MAC address of the second party;

wherein the method further comprises:

receiving, by the second protocol layer, an address resolution request message from the first party, wherein a source address of the address resolution request message is an NLP address of the first party, a destination address of the address resolution request message is an NLP address of the second party, the address resolution request message comprises an MAC address of the first party and a first signature, the first signature is generated based on a first private key of the first party, and the NLP address of the first party is a public key corresponding to the first private key;

generating, by the second protocol layer, a first response message, wherein the first response message is a response message corresponding to the address resolution request message, a source address of the first response message is the NLP address of the second party, a destination address of the response message is the NLP address of the first party, the response message comprises the MAC address of the second party and a second signature, the second signature is generated based on a second private key of the second party, and the NLP address of the second party is a public key corresponding to the second private key.

9. The method according to claim 8, wherein the obtaining, by the second protocol layer of the second party, the first temporary public key of the first party, comprises:

obtaining, by the second protocol layer of the second party, a key negotiation request message from the first party, wherein the key negotiation request message comprises a third signature and the first temporary public key, a source address of the key negotiation request message is an NLP address of the first party, a destination address of the key negotiation request message is an NLP address of the second party, the third signature is generated based on a first private key of the first party, and the NLP address of the first party is a public key corresponding to the first private key.

10. The method according to claim 9, wherein the generating, the second protocol layer, the second temporary key pair, comprises:

generating, the second protocol layer, the second temporary key pair, after the second protocol layer determines that the third signature has been verified according to the NLP address of the first party.

11. The method according to claim 10, wherein the generating, by the second protocol layer, the message carrying the second temporary public key, comprises:

generating, by the second protocol layer, a second response message, wherein the second response message is a response message corresponding to the key negotiation request message, the second response message comprises a fourth signature and the second temporary public key, a source address of the second response message is the NLP address of the second party, a destination address of the second response message is the NLP address of the first party, the fourth signature is generated based on a second private key of the second party, and the NLP address of the second party is a public key corresponding to the second private key.

12. The method according to claim 8, further comprising:

generating, by the second party, the second private key randomly;

generating, by the second party, the public key corresponding to the second private key through elliptic curve cryptography according to the second private key;

using, by the second party, the public key corresponding to the second private key as the NLP address of the second party.

13. The method according to claim 8, wherein the first response message is an extended Address Resolution Protocol, ARP, message, and the method further comprises:

encrypting, by the second party, to-be-signed content in the first response message according to the second private key, to obtain the first signature.

14. The method according to claim 8, wherein the to-be-signed content comprises a time stamp, and the time stamp is used for verifying timeliness of the first response message.

15. A method for source address authentication, applied to a receiving party, wherein the receiving party uses a new link protocol, NLP, stack, and the method comprises:

receiving an NLP data packet sent from a sending party; wherein the NLP data packet is obtained by encapsulating a signature of the sending party, an NLP source address, to-be-sent data, a serial number for preventing replay attack and an NLP destination address, the signature of the sending party is generated using a sending party private key of the sending party, the NLP destination address is a receiving party public key of the receiving party, the NLP source address is a sending party public key of the sending party, and the sending party uses the NLP stack;

obtaining the NLP source address, the signature of the sending party and the serial number from the NLP data packet;

verifying authenticity and non-repeatability of a source of the NLP data packet based on the NLP source address, the signature of the sending party and the serial number, storing the serial number and obtaining the to-be-sent data based on that the verification passes, and discarding the NLP data packet based on that the verification fails.

16. The method according to claim 15, wherein the verifying the authenticity and non-repeatability of the source of the NLP data packet based on the NLP source address, the signature of the sending party and the serial number, comprises:

verifying the signature of the sending party by using the NLP source address, and determining that the source of the NLP data packet is the sending party based on that the verification is successful;

determining whether the serial number for preventing replay attack is greater than a serial number in an NLP data packet previously received from the sending party, and determining that the NLP data packet is not repetitive based on that the serial number is greater than the serial number in the NLP data packet previously received.

17. An encrypted communication apparatus, applied to a first party, wherein the first party uses a new link protocol, NLP, stack, and the apparatus comprises a processor configured to perform the method according to claim 1.

18. An encrypted communication apparatus, applied to a second party, wherein the second party uses a new link protocol, NLP, stack, and the apparatus comprises a processor configured to perform the method according to claim 8.

* * * * *